(12) United States Patent
Saito

(10) Patent No.: US 11,836,039 B2
(45) Date of Patent: Dec. 5, 2023

(54) MEMORY CONTROLLER AND MEMORY SYSTEM

(71) Applicant: KIOXIA CORPORATION, Tokyo (JP)

(72) Inventor: Yoshiki Saito, Kawasaki Kanagawa (JP)

(73) Assignee: Kioxia Corporation, Tokyo (JP)

( * ) Notice: Subject to any disclaimer, the term of this patent is extended or adjusted under 35 U.S.C. 154(b) by 55 days.

(21) Appl. No.: 17/466,183

(22) Filed: Sep. 3, 2021

(65) Prior Publication Data
US 2022/0308953 A1    Sep. 29, 2022

(30) Foreign Application Priority Data

Mar. 23, 2021  (JP) .................................. 2021-0458592

(51) Int. Cl.
*G06F 11/07*  (2006.01)
*G06F 11/10*  (2006.01)

(52) U.S. Cl.
CPC ...... *G06F 11/0793* (2013.01); *G06F 11/0727* (2013.01); *G06F 11/0751* (2013.01); *G06F 11/1004* (2013.01)

(58) Field of Classification Search
None
See application file for complete search history.

(56) References Cited

U.S. PATENT DOCUMENTS

| 5,822,251 A | * | 10/1998 | Bruce .................... G06F 13/28 |
| | | | 714/E11.038 |
| 8,341,501 B2 | | 12/2012 | Franceschini et al. |
| 8,601,347 B1 | * | 12/2013 | Koseki ................ G06F 11/1048 |
| | | | 714/764 |
| 9,594,627 B2 | | 3/2017 | Kanno et al. |
| 9,760,292 B2 | | 9/2017 | Oohira |
| 2016/0350177 A1 | | 12/2016 | Kanno et al. |

(Continued)

FOREIGN PATENT DOCUMENTS

| DE | 102019132799 A1 * | 8/2020 | .......... G06F 11/1076 |
| JP | 6346123 B2 | 6/2018 | |

OTHER PUBLICATIONS

"The Challenge of Keeping up With Data", Product Brief, Data Center, Intel Optane DC Persistent Memory, https://www.intel.co.jp/content/dam/www/public/us/en/documents/product-briefs/optane-dc-persistent-memory-brief.pdf, 2019, 6 pages.

*Primary Examiner* — Guerrier Merant
(74) *Attorney, Agent, or Firm* — Kim & Stewart LLP

(57) ABSTRACT

According to one embodiment, a memory controller controls a plurality of non-volatile memory chips. The memory controller includes a memory that stores first data and a processing unit that processes the first data stored in the memory. During a write operation, the processing unit generates second data including the first data and additional data corresponding to the first data, changes the bit order of the second data based on information indicating the state of the write destination of the second data, and writes the second data having the changed bit order to the plurality of non-volatile memory chips. During a read operation, the processing unit reads the second data having the changed bit order from the plurality of non-volatile memory chips and revert the bit order of the read second data to the original state based on the information.

18 Claims, 14 Drawing Sheets

(56) References Cited

U.S. PATENT DOCUMENTS

2018/0287632 A1* 10/2018 Rom ..................... G06F 3/0688
2018/0287634 A1* 10/2018 Rom ................. H03M 13/3715
2018/0287636 A1* 10/2018 Rom ................. H03M 13/1102

* cited by examiner

| LOGICAL ADDRESS (INDEX) | PHYSICAL ADDRESS | BIT ORDER INFORMATION |
|---|---|---|
| LA | PA | BOI |
|  |  |  |
|  |  |  |
|  |  |  |

MEMORY CONTROLLER AND MEMORY SYSTEM

CROSS-REFERENCE TO RELATED APPLICATION

This application is based upon and claims the benefit of priority from Japanese Patent Application No. 2021-048592, filed Mar. 23, 2021, the entire contents of which are incorporated herein by reference.

FIELD

Embodiments described herein relate generally to a memory controller and a memory system.

BACKGROUND

Storage class memory (SCM) modules are examples of a memory system. An SCM module is a device for filling the performance gap between the read-write performance of a main memory, such as a dynamic random access memory (DRAM), and the read-write performance of a storage device such as a solid-state drive (SSD). The SCM module can read and write data faster than the storage devices such as solid-state drives, so a processor or the like can speedup reading or writing of data by temporarily storing the data in an SCM module instead of a slower storage device.

DETAILED DESCRIPTION

Figure 1:
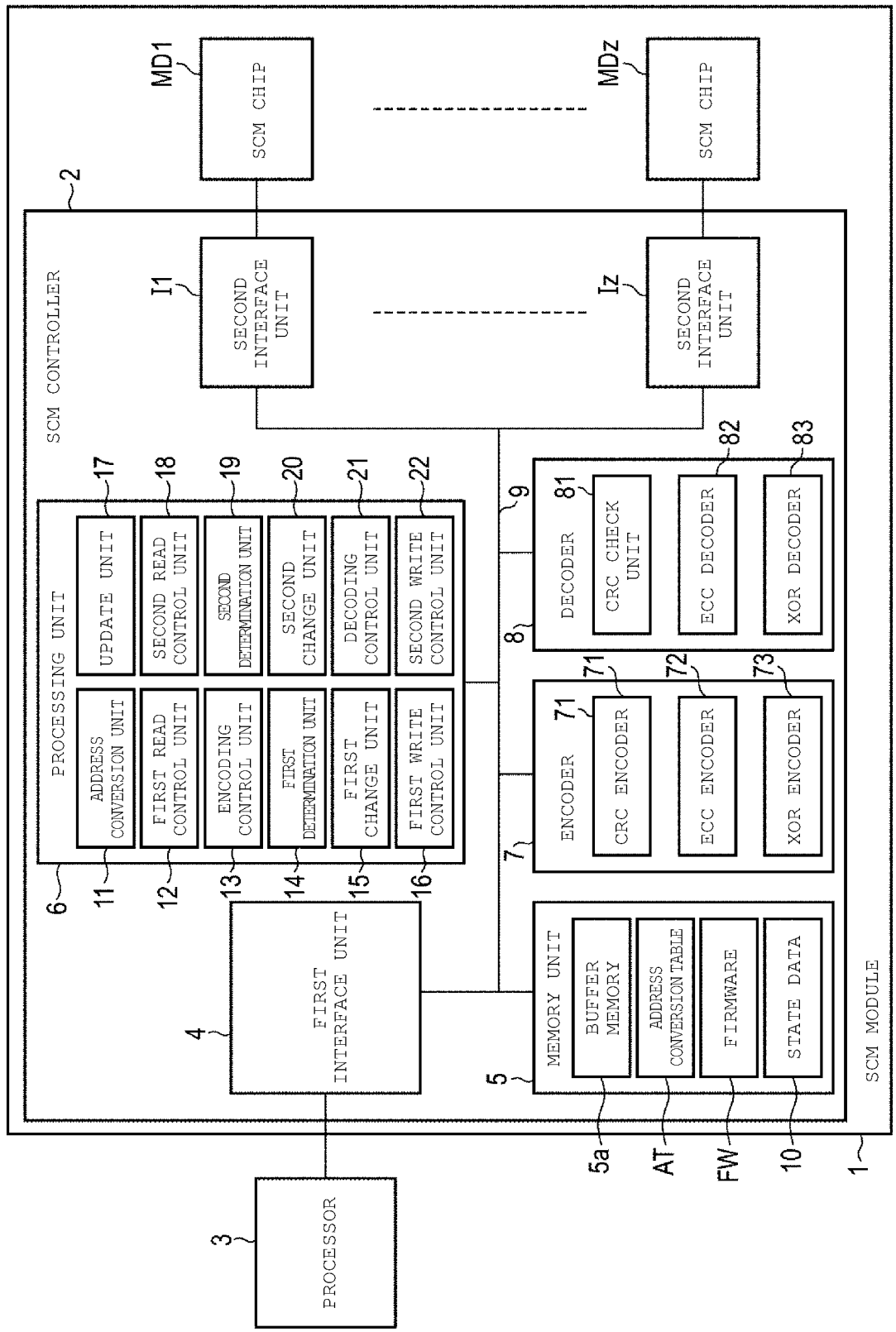
FIG. 1 is a block diagram illustrating an example of a configuration of a storage class memory (SCM) module according to a first embodiment.

Embodiments provide a memory controller and a memory system that improve durability of non-volatile memories.

In general, according to one embodiment, a memory controller controls a plurality of non-volatile memory chips. The memory controller includes a memory that stores first data and a processing unit that processes the first data stored in the memory. The processing unit, during a write operation, generates second data including the first data and additional data corresponding to the first data, changes the bit order of the second data based on information indicating the state of the write destination of the second data, and then writes the second data having the changed bit order to the plurality of non-volatile memory chips. The processing unit, during a read operation, reads the second data having the changed bit order from the plurality of non-volatile memory chips and restores the bit order of the read second data to the original state based on the information indicating the state of the read destination.

Hereinafter, certain example embodiments will be described with reference to the drawings. In the following description, substantially the elements or aspects that are the same or substantially similar are denoted by the same reference numerals, and redundant description of such elements or aspects will be given only when necessary. Furthermore, details such as the numerical values and the number of elements described in each embodiment are examples and can be changed as appropriate.

First Embodiment

The first embodiment describes a memory controller and a memory system that changes the bit order of the predetermined amount of data written to a plurality of non-volatile memory chips (or storage devices), performs a control for returning the bit order of the predetermined amount of data read from the plurality of non-volatile memory chips to the original state (that is, the state before the change), and improves durability of the plurality of non-volatile memory chips.

Here, the "amount" of data indicates, for example, the size of the data (e.g., number of bytes or the like). However, when data refers to one or more sub-data units or pieces of the predetermined size (e.g., a unit size), then the "amount" of the data may refer to the total number of units/pieces of sub-data.

In the first embodiment, each described functional block may be implemented by hardware, computer software, or a combination of both. Each functional block may be divided into a plurality of pieces (sub-units or the like). In some examples, a plurality of functional blocks may be combined to form one block or the like. Likewise, in the other examples, some functions described for a one functional block may be performed by another functional block, instead.

Any process flow described in the first embodiment is not limited to the particularly illustrated order. The order of processes can be changed as appropriate. The certain processes of the process flow may be performed in parallel with another process as appropriate.

In the present disclosure, description that one element is connected to another element may include the element being directly or indirectly connected to the other element. For example, one element can be said to be electrically connected to another element even when the electrical connection is not constant or rather is selectively connected at points in a process such as a connection between to elements incorporating a switching element.

In the first embodiment, a case where a memory system is an SCM module will be described as an example. However, the memory system is not limited to SCM modules and may be any one of the various types of storage devices such as a solid state drive (SSD), a universal flash storage (UFS) device, a Universal Serial Bus (USB®) memory, a memory card, and a hybrid storage system including a hard disk drive and a SSD.

FIG. 1 is a block diagram illustrating an example of a configuration of the SCM module 1 according to the first embodiment.

The SCM module 1 changes the bit order of data during a write operation of writing the data received from the processor 3 to non-volatile memories and a read operation of transmitting the data read from the non-volatile memories to the processor 3.

In the present context, "changing the bit order" means, dividing data of the predetermined unit into a plurality of pieces of sub-data and changing the arrangement or ordering of the plurality of pieces of sub-data. The size of one piece of sub-data may be, for example, the value obtained by dividing the size of data of the predetermined unit size by the number of a plurality of non-volatile memory chips which are available as the write destination.

In the first embodiment, the SCM module 1 manages the state information indicating the state of wear, wear-out, exhaustion, or degradation for each unit of management (management unit), for example, in order to change the bit order of data. The management unit may be a frame or a management unit for a wear leveling operation. In addition, the management unit of the state information may be any one of a chip unit, a cache line unit, a unit larger than the cache line, a unit smaller than the cache line, or a set (bit set) of the predetermined number of bits. The cache line unit is a unit size of the cache line of a cache memory used by a processor 3.

The frame is data including a data body and the additional data used for error detection and correction for the frame or a unit of the data. In the first embodiment, the case where the data body included in the frame is user data or system management information will be described. The user data is, for example, data received by the SCM module 1 from the processor 3 as write target data (data to be written to the SCM module 1). The system management information is, for example, information used for the internal operations performed by the SCM module 1. Hereinafter, the data body may also be referred to as a payload portion.

The wear leveling operation is a process for extending the lifetime of a non-volatile memory by avoiding a concentration of writes (wear) in particular locations in the non-volatile memory. The wear leveling process spreads the exhaustion (use) across the different memory cells in the non-volatile memory to avoid overuse of any particular memory cells.

In the first embodiment, the SCM module 1 does not change the bit order when the data body is not user data but is rather the system management information.

In the first embodiment, it is assumed that the SCM module 1 can execute an in-place update operation to the non-volatile memory. In the first embodiment, the in-place update operation assumes that a specific physical address can be designated when data is written to the non-volatile memory.

In the first embodiment, the SCM module 1 may change the bit order of the data in read-modify-write (Read Modify Write) operation performed by the SCM module 1. The read-modify-write operation is an operation of reading data in the memory cells of the non-volatile memory in the SCM module 1, modifying the data, and writing the modified data to the memory cells of the non-volatile memory. The non-volatile memory can be the SCM chips MD1 to MDz. In some examples, the non-volatile memory can be one SCM chip of the SCM chips MD1 to MDz.

Hereinafter, the first read-modify-write operation and the second read-modify-write operation performed by the SCM module 1 will be described.

The first read-modify-write operation is performed in each of the SCM chips MD1 to MDz. Here, among the SCM chips MD1 to MDz, the SCM chip MD1 will be used for description.

The SCM chip MD1 receives a write request and write target data from the SCM controller 2, and when the SCM chip MD1 writes the received write target data to the memory cells at the write destination, the memory cells at the write destination are easily worn out. Therefore, the SCM chip MD1 reads data from the memory cells at the write destination once before writing the write target data to the memory cells, compares the read data with the write target data, and then writes only to those memory cells corresponding to those where already stored bits are different from the write target data. When there are memory cells at the write destination that already store bits corresponding to the write target data, the corresponding bits of the write target data are not rewritten to the memory cells at the write destination, and thus, the memory cells can be prevented from being worn out by unnecessary write operations on individual memory cells. This process is the first read-modify-write operation performed by the SCM chip MD1.

The second read-modify-write operation is performed by the SCM controller 2. The SCM controller 2 writes a frame to the SCM chips MD1 to MDz during the in-place update operation. The frame includes a data body and the parity for detecting and correcting an error in the frame. When reading the frame written to the SCM chips MD1 to MDz later, the SCM controller 2 can correct an error by using the parity even when the error occurs in part of the frame (for example, when the written data body is different from the read data body). The parity value is calculated from the all the data included in the frame (other than the parity value itself). Accordingly, when even one portion of the data in the frame is updated, the value of the parity for the frame must also be recalculated and updated.

It is assumed that each frame includes multiple 64-byte data as the data body and the parity corresponding to the data body. When the SCM controller 2 receives a write request with a 64-byte data and the specified logical address, the SCM controller 2 acquires a physical address corresponding to the logical address by using the address conversion table AT to be described below. The SCM controller 2 cannot simply write the 64-byte write target data by the in-place update method to the positions corresponding to the physical addresses in the SCM chips MD1 to MDz. This is because the 64-byte data corresponding to another logical address may be included in the same frame at the physical address corresponding to the logical address, and the parity calculated based on the data in the same frame needs to be updated. Therefore, the SCM controller 2 reads the entire portion of the frame at the position designated by the physical address, overwrites the write target data in the SCM controller 2, recalculates the parity, and generates a new frame. Then, the SCM controller 2 writes the new frame at the position designated by a physical address. This process is the second read-modify-write operation performed by the SCM controller 2.

When the SCM controller 2 repeatedly receives a write requests (for example, random write requests) from the processor 3, the SCM controller 2 repeats the second read-modify-write operations for the SCM chips MD1 to MDz, and the parities in the corresponding frames are updated for each read-modify-write operation. The random write requests are random write commands in which addresses of the write target data are not sequential.

In the first embodiment, the SCM controller 2 can level the wear of the memory cells that store a frame by changing the bit order of the frame and shifting a position of the parity.

Hereinafter, a configuration of the SCM module 1 will be described.

The SCM module 1 includes a plurality of the SCM chips MD1 to MDz and the SCM controller 2. In the first embodiment, z is an integer of 2 or more.

The SCM module 1 communicates with the processor 3 via a memory bus or an external bus. In the following, the memory bus or the external bus will be omitted to simplify the description.

The processor 3 is any one of various processing devices such as a central processing unit (CPU), a micro-processing unit (MPU), a digital signal processor (DSP), and a graphics processing unit (GPU).

The SCM module 1 may communicate with a host device, an external information processing device, or the like instead of the processor 3. In this case, the SCM module 1 may perform communication conforming to a predetermined standard with the host device or the external information processing device. The predetermined standard may be, for example, a Non-Volatile Memory Express (NVMe®) standard, a Peripheral Component Interconnect Express (PCIe®) standard, a serial advanced technology attachment (SATA) standard, Double Data Rate (DDR), Compute Express Link (CXL) or a serial attached small computer system interface (SAS) standard, or the like.

The SCM chips MD1 to MDz are examples of storage devices, which may be, in other examples, things other than chips, such as packaged devices or the like. The SCM chips MD1 to MDz may be, for example, a resistive random access memory (ReRAM). However, the SCM chips MD1 to MDz are not limited to the ReRAM and may be any one of a magnetoresistive random access memory (MRAM), a phase-change random access memory (PRAM), a ferroelectric random access memory (FeRAM), a NAND flash memory, and a NOR flash memory.

The SCM chips MD1 to MDz will be specifically described below with reference to FIGS. 2 to 8.

The SCM controller 2 controls the SCM chips MD1 to MDz according to the commands received from the processor 3. Further, the SCM controller 2 controls the SCM chips MD1 to MDz as a background process without receiving a command from the processor 3. More specifically, the SCM controller 2 controls write of data to the SCM chips MD1 to MDz and controls read of data from the SCM chips MD1 to MDz.

The SCM controller 2 receives the first data from the processor 3 during write operation of data. In the first embodiment, it is assumed that the first data is user data to be included in the corresponding frame.

The SCM controller 2 adds the parity as the additional data for the first data for error correction to one or more user data written to the SCM chips MD1 to MDz and generates the second data including the user data and the parity data. In the first embodiment, it is assumed that the second data is a frame.

The SCM controller 2 determines whether or not to change the bit order of the frame based on state information, which is information indicating the data type of the frame.

When the SCM controller 2 determines to change the bit order of the frame, the bit order of the frame is changed based on the content of the state information.

Then, the SCM controller 2 writes the frame or the frame having a changed bit order to the SCM chips MD1 to MDz.

In the first embodiment, a case where the SCM controller 2 writes a frame to the SCM chips MD1 to MDz will be described as an example. However, the SCM controller 2 may perform the same control when writing a frame to one SCM chip or two or more of the SCM chips MD1 to MDz.

The SCM controller 2 reads a frame from the SCM chips MD1 to MDz during a read operation of data.

The SCM controller 2 determines whether or not to change the bit order of the read frame (in other words, restore the changed bit order of the frame to the original state) based on the state information.

When the bit order of the read frame is changed, the SCM controller 2 changes (restores) the bit order of the frame according to the state information.

The SCM controller 2 performs a process for error detection and correction for the frame based on the parity data included in the frame.

In the first embodiment, an SCM controller 2 in the SCM module 1 performs error detection and error correction when data is read from a plurality of non-volatile memory chips (MD1 MDz). The SCM controller 2 detects an error and performs the error handling process when the error correction fails. In the following description, a case where the error can be corrected after the SCM controller detects the error will be primarily described, and detailed description of the error handling process performed when the error correction fails will be omitted.

Then, the SCM controller 2 transmits the user data to the processor 3.

The SCM controller 2 includes the first interface unit 4, the second interface units I1 to Iz, a memory unit 5 including a buffer memory 5a, a processing unit 6, an encoder 7, and a decoder 8. The first interface unit 4, the second interface units I1 to Iz, the memory unit 5, the processing unit 6, the encoder 7, and the decoder 8 can transmit to or receive from each other data, information, signals, commands, requests, messages, instructions, and responses via a bus 9.

The first interface unit 4 receives data, information, signals, commands, requests, messages, instructions, responses, and the like from the processor 3. Further, the first interface unit 4 transmits data, information, signals, commands, requests, messages, instructions, responses, and the like to the processor 3.

The first interface unit 4 temporarily writes user data received from the processor 3 to the buffer memory 5a in the memory unit 5. Further, the first interface unit 4 reads the user data temporarily stored in the buffer memory 5a and transmits the read user data to the processor 3.

The second interface units I1 to Iz are electrically connected to the SCM chips MD1 to MDz, respectively. The second interface units I1 to Iz are circuits for communicating data, information, signals, commands, requests, messages, instructions, responses, and the like to and from the SCM chips MD1 to MDz. The second interface units I1 to Iz can respectively perform write to or read from the SCM chips MD1 to MDz in parallel with each other. In other words, the SCM controller 2 can perform write to or read from at least two of the SCM chips MD1 to MDz in parallel. In the following, the second interface units I1 to Iz may be omitted for the sake of simple description.

The memory unit 5 may include a volatile memory and a non-volatile memory. The memory unit 5 may include, for example, a read only memory (ROM) and a random access memory (RAM). The memory unit 5 may be used for processes of the first interface unit 4, the second interface units I1 to Iz, the processing unit 6, the encoder 7, and the decoder 8. The memory unit 5 may be, for example, a static random access memory (SRAM). The memory unit 5 may be a combination of a dynamic random access memory (DRAM) and a SRAM. The memory unit 5 may be disposed outside the SCM controller 2 instead of inside.

The memory unit 5 includes the buffer memory 5*a*. The buffer memory 5*a* stores, for example, the user data received from the processor 3 and the user data to be transmitted to the processor 3. The buffer memory 5*a* may be disposed outside the memory unit 5 in some examples. The buffer memory 5*a* may be provided in, for example, the first interface unit 4.

The memory unit 5 stores state data 10, an address conversion table AT, and firmware FW.

The state data 10 includes, for example, state information indicating a state of wear, wear-out, exhaustion, or degradation for each management unit of the SCM chips MD1 to MDz. The state data 10 is dynamically updated. The state information may include information indicating the use state of each management unit of the SCM chips MD1 to MDz. The information indicating the use state includes, for example, the number of writes (updates), the number of reads, the number of erasures, the frequency of writes (updates), the frequency of reads, the frequency of erasures, or a combination thereof. In the present context, the frequency refers to the number of events (e.g., writes, updates, reads, erases, etc.) per unit time. In the first embodiment, a case where the management unit of the SCM chips MD1 to MDz is the management unit for the wear leveling process and the state information is the number of writes will be described as an example. In a case where the SCM chips MD1 to MDz are MRAMs, when data is read from the MRAM, data stored in the MRAM is destroyed. In this case, state information of the state data 10 may include the number of reads. The state data 10 is an example of system management information.

The state data 10 may include information of the data type of each frame written to the SCM chips MD1 to MDz. The information for each type may be information indicating whether the data written to the SCM chips MD1 to MDz is the user data or the system management information.

The state data 10 may include a value obtained by weighting the number of writes according to a write method (type of write) for each management unit. The write method includes, for example, the first read-modify-write method in which the data is read from SCM chips MD1 to MDz and then the data is written thereto. Further, another write method includes a standard write method in which the data is not read from the memory cells in the SCM chips MD1 to MDz to compare with the write target data, but is written thereto without comparing. In the standard write method, the data is written to all memory cells of a write destination unlike the operation of the first read-modify-write. In the first read-modify-write method, only the memory cells having inverted bits are considered worn out, whereas in the standard write method, all memory cells of the write destination, which include any memory cells having non-inverted bits, are considered worn out. As such, there may be a difference in progress of wear-out of memory cells between the first read-modify-write method and the standard write method. Accordingly, the weighting of the write method by which memory cells are worn out more quickly is increased relative to the weighting of a write method by which memory cells are worn out more slowly.

For example, when wear-out of memory cells changes depending on the temperature during a write operation, the state data 10 may include, for example, a value weighted by temperature during the write operation for each management unit as the state information. The temperature of the memory cell in each of the SCM chips MD1 to MDz may be measured by a temperature sensor in each of the SCM chips MD1 to MDz or the like.

The state data 10 may include values weighted by the number of bits inverted during a write operation for each management unit as the state information. In this case, the state data 10 indicates that the wear state further progresses as the management unit has a larger number of inverted bits in a write operation.

There may be metadata corresponding to the user data or the system management information, and the metadata may include information that can be used as the state information of the state data 10. In this case, the SCM controller 2 may generate or update the state data 10 based on the metadata.

In the first embodiment, the state data 10 is separate from the frame and is written to a position different from the frame.

The address conversion table AT associates a logical address of data stored in the SCM chip MD1 to MDz with a physical address specifying a position where the data is stored. The address conversion table AT is an example of system management information.

As described above, memory cells are worn out by repeating write and the like. For example, when the processor 3 repeatedly requests to write data to the same logical address, the SCM controller 2 performs write operations for the SCM chips MD1 to MDz by the in-place update method. In this case, wear-out of the same memory cells is increased, and the memory cell subjected to progressive wear-out will eventually reach the end of its lifetime and thus data cannot be written properly thereto. In order to prevent the wearing out of specific memory cells from progressing, the SCM controller 2 performs the wear leveling process. The SCM controller 2 includes the state information, and when the processor 3 repeatedly requests write to the same logical address, the SCM controller 2 performs the write to memory cells for which the wearing out has not yet progressed to the same extent as the previously targeted memory cells. The address conversion table AT is the data indicating which data is written to which position in the SCM chips MD1 to MDz. By referring to the address conversion table AT, the SCM controller 2 can know which physical position of the SCM chips MD1 to MDz the logical address of access target data corresponds to.

The firmware FW is an example of software executed by the processing unit 6. The firmware FW includes code and data. The firmware FW is executed by the processing unit 6 to control the first interface unit 4, the second interface units I1 to Iz, the memory unit 5, the encoder 7, and the decoder 8. The firmware FW is an example of system management information.

In the first embodiment, the firmware FW causes the processing unit 6 to function as an address conversion unit 11, a first read control unit 12, an encoding control unit 13, a first determination unit 14, a first change unit 15, a first write control unit 16, an update unit 17, a second read control unit 18, a second determination unit 19, a second change unit 20, a decoding control unit 21, and a second write control unit 22. Further, the firmware FW is executed by the processing unit 6 to perform the wear leveling process for the SCM chips MD1 to MDz.

During a write operation, the address conversion unit 11 converts the logical address of a write destination into the physical address of a write destination based on the address conversion table AT stored in the memory unit 5.

During a read operation, the address conversion unit 11 converts the logical address of a read target into the physical address of the read target based on the address conversion table AT stored in the memory unit 5.

The first read control unit 12 reads data stored in the memory unit 5 during a write operation.

The encoding control unit 13 uses the encoder 7 to ensure reliability of the data and generates a frame including the data read from the memory unit 5 and the additional data including information for error correction corresponding to the data.

The first determination unit 14 determines whether or not to change the bit order of each frame of the write target.

For example, the first determination unit 14 may determine whether or not to change the bit order of the frame based on the type of the data included in the frame. More specifically, the first determination unit 14 determines to change the bit order of the frame when the data read from the memory unit 5 is user data received from the processor 3. The SCM controller 2 acquires system management information from the SCM chips MD1 to MDz before the bit order of the frame can be changed. In the first embodiment, the system management information is stored in the SCM chips MD1 to MDz. Therefore, the SCM controller 2 acquires the system management information from the SCM chips MD1 to MDz by reading the system management information from the SCM chips MD1 to MDz. When the data read from the memory unit 5 is system management information, the first determination unit 14 determines whether to change the bit order based upon the particular type of system management information that has been read. For example, certain types or kinds of system management information will be determined by the first determination unit to have the bit order of the frame changed.

In other words, the first determination unit 14 determines that the bit order of the frame including the system management information does not need to be changed. In this case, the first write control unit 16 writes the frame as it is without changing the bit order of the frame to the SCM chips MD1 to MDz.

Here, it will be specifically described that the bit order of a frame including a read portion of the system management information is not changed between the time when the SCM module 1 starts up and the time when the state data 10 is read.

In the first embodiment, the SCM controller 2 changes the bit order of the frame which is frequently updated such that the parity or the like is changed. Thereby, wear-out of memory cells in the frame is leveled, and the lifetimes of the memory cells are extended. A data body of the frame includes user data or system management information. The SCM controller 2 includes the state information of write target frames in order to determine whether or not to change the bit orders. When the SCM module 1 starts up, the SCM controller 2 reads the system management information from the SCM chips MD1 to MDz and stores in the memory unit 5. For example, immediately after the SCM module 1 starts up, the memory unit 5 of the SCM controller 2 is basically free, and the SCM controller 2 does not have the state information. In this state, the SCM controller 2 cannot change the bit order of frames read from the SCM chips MD1 to MDz. The order that the SCM controller 2 reads the address conversion table AT, the firmware FW, and the state data 10 from the SCM chips MD1 to MDz during startup depends on the implementation, but the SCM controller 2 cannot change the bit order of the frames at least until the state data 10 is read. Accordingly, in the first embodiment, the SCM controller 2 cannot restore, to the original state, the bit orders of frames including the state data 10 and a frame read between the startup and the time when the state data 10 is read from the SCM chips MD1 to MDz, and thus, the bit orders are not changed.

More specifically, when the SCM controller 2 reads the other system management information, the firmware FW, the address conversion table AT, and the state data 10 in this order from the SCM chips MD1 to MDz, and stores the other system management information, the firmware FW, the address conversion table AT, and the state data 10 in the memory unit 5, the SCM controller 2 cannot change the bit order until read of the state data 10 is finished. Accordingly, during the write operations, the SCM controller 2 does not change the bit orders of any of the frames including the other system management information, the frames including the firmware FW, the frames including the address conversion table AT, and the frames including the state data 10.

If the SCM controller 2 reads the firmware FW, the state data 10, the address conversion table AT, and other system management information in this order from the SCM chips MD1 to MDz, and stores the firmware FW, the state data 10, and the address conversion table AT, and other system management information in the memory unit 5, the SCM controller 2 can change the bit order by finishing reading of the state data 10. Accordingly, the SCM controller 2 does not change the bit orders of a frame including the firmware FW and a frame including the state data 10 during the write operations. During a write operation, the SCM controller 2 may change or may not change the bit orders of the frames including the address conversion table AT and the frames including the other system management information.

When the SCM controller 2 receives a random write request from the processor 3 (that is, when a write method is random write), the first determination unit 14 determines that a bit order of a frame including the write target data is to be changed.

For example, when the SCM controller 2 receives a write request and consecutive addresses from the processor 3 (that is, when a write method is sequential write), the first determination unit 14 determines that a bit order of a frame written to the SCM chips MD1 to MDz is not to be changed based on the consecutive addresses. In a case of the sequential write, the entire data body included in the frame is updated to the latest data, and additional data including a parity is also updated according to the data body. Therefore, the frame generated in the case of sequential write causes memory cells to be worn out over all frames. As such, in the case of sequential write, even when a bit order of a frame is changed, an effect of leveling wear-out of memory cells is not obtained. Accordingly, the first determination unit 14 determines that, when a write method is sequential write, a bit order of a frames written to the SCM chips MD1 to MDz is not to be changed based on consecutive addresses. In this case, the first write control unit 16 writes the frame as it is to the SCM chips MD1 to MDz.

For example, the first determination unit 14 may determine whether or not to change the bit order of a frame based on the number of writes of the frame in the state data 10. More specifically, the first determination unit 14 determines that, when the number of writes of the frame is greater than or equal to the first write number, the bit order of the frame is to be changed.

For example, the first determination unit 14 may determine whether or not to change the bit order of a frame based on the number of writes of the management unit corresponding to the write destination of the frame in the state data 10 and at least one threshold. More specifically, the first determination unit 14 determines that the number of writes of the management unit corresponding to the write destination of the frame is divided by a predetermined value, and the bit order of a frame is changed according to the resulting quotient.

The first change unit 15 changes the bit order of a frame when the first determination unit 14 determines that the bit order is to be changed.

More specifically, the first change unit 15 changes the bit order of the frame according to the result obtained by dividing the number of writes of the management unit corresponding to a write destination of the frame by the predetermined value.

For example, when changing the bit order of the frame, the first change unit 15 may change positions of a plurality of bit sets obtained by dividing the bits of the frame into a plurality of bits. The bit set is, in other words, a bundle or a group of bits. The number of bits configuring the bit set may be, for example, a divisor of the number of bits configuring the additional data included in the frame. Alternatively, the number of bits configuring the bit set may be a divisor of an access unit of the SCM controller 2 to each of the SCM chips MD1 to MDz. Here, the access unit is a unit size of data of a write target and a unit size of data of a read target.

The first change unit 15 may shift the bits of the frame by, for example, 64 bytes, which is an access unit of the processor 3 to the SCM module 1. In the first embodiment, the size of the access unit of the processor 3 to the SCM module 1 may be the same as a cache line size of a cache memory used by the processor 3.

When the first determination unit 14 determines that the bit order of a frame is to be changed, the first write control unit 16 writes the frame having the bit order changed by the first change unit 15 to the position indicated by a physical address of the write destination of the frame in the SCM chips MD1 to MDz via the second interface units I1 to Iz.

If the first determination unit 14 determines that the bit order of the frame is not to be changed, the first write control unit 16 writes the frame to the position indicated by the physical address of the write destination of the frame in the SCM chips MD1 to MDz via the second interface units I1 to Iz.

When a write operation of a frame is performed for the SCM chips MD1 to MDz, the update unit 17 updates state information of the management unit related to the write operation, for the state data 10. Specifically, the update unit 17 increments the number of writes of a management unit corresponding to a write destination.

For example, the write number management unit used for a wear leveling process may be used as the update unit 17.

During a read operation, the second read control unit 18 reads a frame or a frame having changed bit order from the position indicated by a physical address of the read target frame in the SCM chips MD1 to MDz via the second interface units I1 to Iz.

The second determination unit 19 determines whether or not to change the bit order of the read target frame. In other words, the second determination unit 19 determines whether or not the bit order of the frame read from the SCM chips MD1 to MDz is changed during a write operation and needs to be restored to the original state.

For example, the second determination unit 19 may determine whether or not to change the bit order of the frame based on the type of data included in the frame. More specifically, the second determination unit 19 determines that the bit order of the frame is to be changed when the data included in the frame read from the SCM chips MD1 to MDz is user data. The second determination unit 19 determines that the bit order of the frame is not to be changed when the data included in the frame read from the SCM chips MD1 to MDz is system management information.

For example, the second determination unit 19 may determine whether or not to change the bit order of the frame based on a write method at the time of writing the frame. More specifically, the second determination unit 19 determines that the bit order of the frame of the read target is to be changed when the read target frame is a frame that was written based on a random write request during a write operation. The second determination unit 19 determines that the bit order of the frame or the read target is not to be changed when the frame of the read target is a frame added to the SCM chips MD1 to MDz according to consecutive addresses during the write operation.

For example, the second determination unit 19 may determine whether or not to change the bit order of a frame based on the number of writes of the management unit corresponding to the read target frame in the state data 10. More specifically, the second determination unit 19 determines that the bit order of the frame is to be changed when the number of writes of the management unit corresponding to the read target exceeds a threshold.

The second change unit 20 changes the bit order of the frame when the second determination unit 19 determines that the bit order is to be changed.

For example, the second change unit 20 restores the bit order that was previously changed during a write back to the original state according to the state information included in the state data 10.

For example, the second change unit 20 may return positions of the plurality of bit sets in the read target frame to the original state.

The decoding control unit 21 uses the decoder 8 to performs error detection and error correction for the frame read from the SCM chips MD1 to MDz or the frame having the bit order changed by the second change unit 20 and generates corrected data if an error is detected. More specifically, the decoding control unit 21 performs error detection and error correction for a frame by using the additional data included in the frame.

The second write control unit 22 writes the data for which an error was detected and then subsequently corrected to the memory unit 5.

The encoder 7 is a circuit for generating additional data used for an error detection process and an error correction process. The encoder 7 includes, for example, a cyclic redundancy code (CRC) encoder 71, an error correcting code (ECC) encoder 72, and an exclusive OR (XOR) encoder 73.

The CRC encoder 71 generates a CRC code information for detecting an error in the frame.

The ECC encoder 72 generates an ECC parity for detecting and correcting an error of data.

The XOR encoder 73 generates an XOR parity for detecting and correcting an error for each of the SCM chips MD1 to MDz.

The decoder 8 is a circuit for performing an error detection process and an error correction process for a frame by using the additional data. The decoder 8 includes, for example, a CRC check unit 81, an ECC decoder 82, and an XOR decoder 83.

The CRC check unit 81 detects an error of data based on CRC code information. Specifically, the CRC check unit 81 compares the CRC code information included in the additional data of the frame and calculated by the CRC encoder 71 with the CRC code information that the CRC check unit 81 calculates from data of which error is detected and corrected by the ECC decoder 82. Then, the CRC check unit 81 determines that there is no error when the CRC code information included in the additional data matches the CRC code information calculated by the CRC check unit 81 and that there is an error when the CRC code information included in the additional data does not match the CRC code information calculated by the CRC check unit 81.

The ECC decoder 82 detects and corrects an error of data based on the ECC parity in the additional data of the frame.

The XOR decoder 83 corrects an error of data based on an XOR parity when there is an error that cannot be corrected by the ECC decoder 82.

Here, a relationship between the encoder 7 and the decoder 8, and multicast method will be specifically described.

When a frame is written to and read from the SCM chips MD1 to MDz, an error may be included in the frame. For example, data 0xABCD is written, but when the data is read, the data may be changed (by error) to 0xAACD. In order to correct this error, the SCM controller 2 uses the ECC encoder 72 to generate a frame in which an ECC parity is added to the data 0xABCD during the write operation. The SCM controller 2 then writes this frame to the SCM chips MD1 to MDz. During the read operation, the SCM controller 2 reads this previously written frame from the SCM chips MD1 to MDz and uses the ECC decoder 82 to perform error correction on the data 0xAACD as read from the SCM chips MD1 to MDz to correct the error using the ECC parity included in the frame generated before writing the data 0xABCD.

For example, when the number of error bits (that is, the number of bits incorrectly inverted) increases, or when any one of the SCM chips MD1 to MDz fails, the ECC decoder 82 may not be able to correct the error. In this case, the SCM controller 2 performs decoding by using the XOR decoder 83. The XOR decoder 83 uses the XOR parity generated by the XOR encoder 73 to correct an error of the frame.

For the sake of simpler description, the case where a single frame is written to and read from three SCM chips MD1 to MD3 will be described. It is assumed that the SCM controller 2 writes a data body and an ECC parity to two SCM chips MD1 and MD2 and writes the XOR parity to one SCM chip MD3. It is assumed that the data and the ECC parity written to the two SCM chips MD1 and MD2 are 0b11110000 and 0b10101010 in binary notation. XOR of the data body and ECC parity is calculated as 0b01011010. The arithmetic value of the XOR becomes the XOR parity. As a result, 0b11110000 is written to the SCM chip MD1, 0b10101010 is written to the SCM chip MD2, and 0b01011010 is written to the SCM chip MD3. When a data body, CRC code information, or ECC parity are updated, the XOR parity is also required to be updated.

Thereafter, it is assumed for this example that the SCM chip MD2 fails or otherwise malfunctions. In this case, the SCM controller 2 reads 0b11110000 from the SCM chip MD1 but cannot read data from the SCM chip MD2, so the SCM controller 2 reads 0b01011010 (which is the XOR parity) from the SCM chip MD3. The XOR decoder 83 calculates XOR of 0b11110000 (which is the data read from the SCM chip MD1) and 0b01011010 (which is the XOR parity read from the SCM chip MD3). Thereby, the data 0b10101010 stored in the SCM chip MD2 can be recovered.

The XOR parity is not used when error correction can be performed successfully by the ECC decoder 82. Here, it is assumed that any SCM chip among the SCM chips MD1 to MDz can be used for storing the XOR parity. It is not efficient that, whenever receiving a read request from the processor 3, the SCM controller 2 reads a data body, an ECC parity, and an XOR parity from all of the SCM chips MD1 to MDz. This is because the XOR parity is used only when the ECC decoder 82 cannot correct an error of the frame, and thus the XOR parity is rarely used. As described above, when the number of reads of the XOR parity increases, unnecessary power consumption of the SCM module 1 occurs, and wear-out of memory cells may hasten due to frequent reading of the XOR parity.

A multicast method can be used to prevent an unnecessary XOR parity from being read. In the multicast method, the SCM controller 2 issues a read request only to the SCM chip that stores the data body and the ECC parity among the SCM chips MD1 to MDz, and when the frame can be error-corrected by the ECC decoder 82, the read request is not issued to the SCM chip that stores the XOR parity. The SCM controller 2 issues a read request to the SCM chip that stores the XOR parity only after the frame cannot be error-corrected by the ECC decoder 82.

The processing unit 6 performs various controls according to the firmware FW. The processing unit 6 may be any of various processing devices such as a CPU, an MPU, a DSP, and a GPU.

For example, when the SCM module 1 starts up (initializes), the processing unit 6 reads at least part of the state data 10, at least part of the firmware FW, and at least part of the address conversion table AT from at least one of the SCM chips MD1 to MDz via at least one of the second interface units I1 to Iz. Then, the processing unit 6 stores at least part of the state data 10, at least part of the firmware FW, and at least part of the address conversion table AT in the memory unit 5.

For example, right before the SCM module 1 shuts down, the processing unit 6 writes at least part of the state data 10 stored in the memory unit 5 and at least part of the address conversion table AT to at least one of the SCM chips MD1 to MDz via at least one of the second interface units I1 to Iz.

For example, during a write operation of data, the processing unit 6 functions as the address conversion unit 11, the first read control unit 12, the encoding control unit 13, the first determination unit 14, and the first change unit 15, the first write control unit 16, and the update unit 17, which are described above, according to the firmware FW.

For example, during a read operation of data, the processing unit 6 functions as the address conversion unit 11, the second read control unit 18, the second determination unit 19, the second change unit 20, the decoding control unit 21, and the second write control unit 22, which are described above, according to the firmware FW 21.

Next, the details of a configuration of the SCM chip MD1 according to the first embodiment will be described with reference to FIGS. 2 to 8. It is assumed that the SCM chip MD2 to the SCM chip MDz also have the same configuration as the SCM chip MD1.

Figure 2:
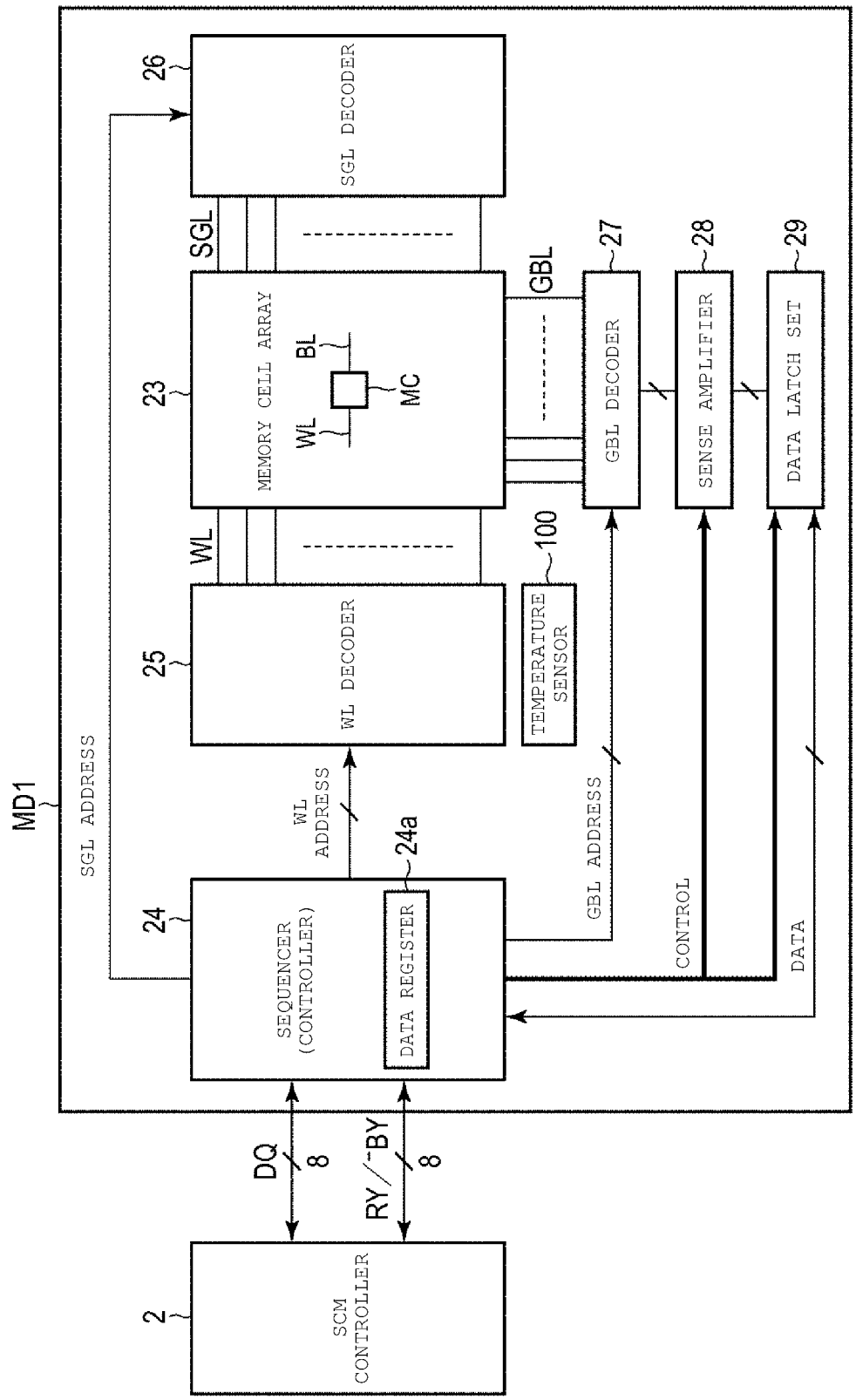
FIG. 2 is a block diagram illustrating an example of an SCM chip according to a first embodiment.

FIG. 2 is a block diagram illustrating an example of the SCM chip MD1. As illustrated in FIG. 2, the SCM chip MD1 includes a memory cell array 23, a sequencer (controller) 24, a word line (WL) decoder 25, a gate line (SGL) decoder 26, a global bit line (GBL) decoder 27, a sense amplifier 28, a data latch set 29, and a temperature sensor 100.

The memory cell array 23 includes a plurality of memory cells MC. The plurality of memory cells MC are configured in pages. Each memory cell MC has a first end connected to one word line WL and a second end connected to one bit line BL. Each bit line BL is connected to one global bit line GBL via a transistor ST (see FIG. 3). Each global bit line GBL is connected to a plurality of bit lines BL via a corresponding transistor ST. Each transistor ST is turned on/of f by via a gate line SGL. The bit lines BL may be referred to as a local bit line to be distinguished from the global bit lines GBL.

The WL decoder 25 is connected to a plurality of word lines WL and includes a word line selection unit and a word line driver. The word line selection unit receives a signal (WL address signal) indicating a word line address from the sequencer 24 and selects a word line WL with a WL address indicated by the received WL address signal. The word line driver applies a required voltage to the selected word line WL and the unselected word lines (unselect word lines) WL under control of the sequencer 24 during read, write, and erase of data.

The SGL decoder 26 is connected to a plurality of gate line SGLs and includes a gate line selection unit and a gate line driver. The gate line selection unit receives a signal (SGL address signal) indicating a gate line address from the sequencer 24 and selects the gate line SGL with a gate line address indicated by the received SGL address signal. The gate line driver applies a required voltage to the selected gate line SGL and the unselected gate lines SGL under the control of the sequencer 24 during read, write, and erase of data.

The GBL decoder 27 is connected to a plurality of global bit line GBLs and includes a global bit line selection unit and a global bit line driver. The global bit line selection unit receives a signal (GBL address signal) indicating a global bit line address from the sequencer 24 and selects a global bit line GBL with a GBL address indicated by the received GBL address signal. The global bit line driver applies a required voltage to the selected global bit line (select global bit line) GBL and the unselected global bit lines (unselect global bit lines) GBL under the control of the sequencer 24 during read, write, and erase of data.

The sense amplifier 28 receives a current flowing through the global bit line GBL selected by the GBL decoder 27 and outputs data stored in the memory cell MC of a read target based on the received current.

The data latch set 29 stores data from the sense amplifier 28 and data from the sequencer 24 and includes a plurality of data latches.

The sequencer 24 communicates a signal DQ and a control signal to and from the SCM controller 2. The signal DQ has a width of, for example, 8 bits and is data, and includes a command, data, an address signal, state data, and the like. The control signal includes a signal RY/⁻BY. The signal RY/⁻BY indicates whether the SCM chip MD1 is in a ready state or in a busy state, and a low level thereof indicates the busy state. The SCM chip MD1 accepts a command from the SCM controller 2 in the ready state and does not accept a command from the SCM controller 2 in the busy state.

The sequencer 24 controls the sense amplifier 28 and the data latch set 29 based on the received command and address signal and transmits (receives) data to (from) the data latch set 29. Further, the sequencer 24 acquires a WL address, an SGL address, and a GBL address from the received address signal.

The sequencer 24 controls the WL decoder 25 and the GBL decoder 27 during write of data to generate a large potential difference between the select word line WL and the select global bit line BL. Due to this potential difference, a resistance state of the memory cell MC is shifted. The sequencer 24 generates a potential difference of a magnitude that does not cause shifting of the resistance state between the select word line WL and the select global bit line BL during read of data, and the sense amplifier 28 detects a current flowing through the select global bit line BL.

The sequencer 24 includes a data register 24a. The data register 24a stores data such as state data. The state data indicates a state of the SCM chip MD1.

The sequencer 24 performs the control for performing the first read-modify-write operation described above.

The temperature sensor 100 measures a temperature of a memory cell provided in the SCM chip MD1.

An element with an alphanumeric character following a notation of "word line WL" to be described below is also the word line WL, and the following alphanumeric characters are used to distinguish the word lines WL from each other. An element with an alphanumeric character following a notation of "bit line BL" to be described below is also the bit line BL, and the following alphanumeric characters are used to distinguish the bit lines BL from each other. An element with an alphanumeric character following a notation of "global bit line GBL" to be described below is also the global bit line GBL, and the following alphanumeric characters are used to distinguish the global bit lines GBL from each other. An element with an alphanumeric character following a notation of "memory cell MC" to be described below is also a memory cell MC, and the following alphanumeric characters are used to distinguish the memory cells MC from each other. An element with an alphanumeric character following a notation of "gate line SGL" to be described below is also a gate line SGL, and the following alphanumeric characters are used to distinguish the gate lines SGL from each other. An element with an alphanumeric character following a notation of "transistor ST" to be described below is also a transistor ST, and the following alphanumeric characters are used to distinguish the transistors ST from each other.

Figure 3:
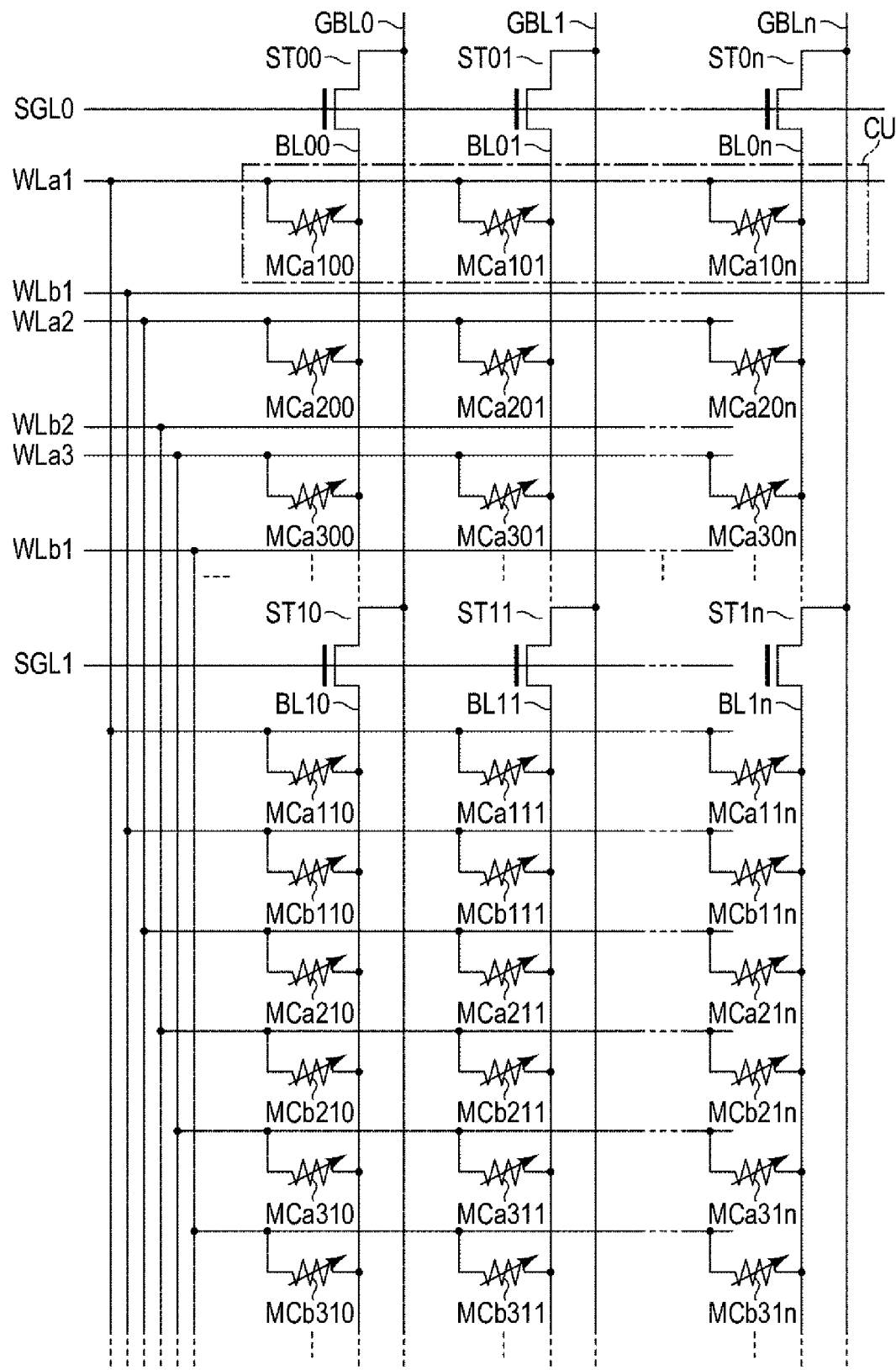
FIG. 3 is a diagram illustrating some elements and connections of a memory cell array according to a first embodiment.

FIG. 3 is a diagram illustrating some elements and connections of the memory cell array 23 according to the first embodiment.

As illustrated in FIG. 3, in each case where $\alpha$ is 0 to k (k is a natural number), a global bit line GBL0 is connected to a bit line BL$\alpha$0 through a transistor ST$\alpha$0. Likewise, in each case where $\alpha$ is 0 to k and in each case where $\beta$ is 0 to n (n is a natural number), a global bit line GBL is connected to a bit line BL$\alpha\beta$ through a transistor ST$\alpha\beta$. In each case where $\alpha$ is 0 to k and in each case where $\beta$ is 0 to n, a transistor ST$\alpha\beta$ has a gate connected to a gate line SGL$\alpha$.

In each case where β is 0 to n and in each case where γ is 0 to m (m is a natural number), a bit line BL0β is connected to a word line WLaγ through a memory cell MCaγ0β. Likewise, in each case where α is 0 to k, in each case where β is 0 to n, and in each case where γ is 0 to m, a bit line BLαβ is connected to a word line WLaγ through a memory cell MCaγαβ. Further, in each case where α is 0 to k, in each case where β is 0 to n, and in each case where γ is 0 to m, a bit line BLαβ is connected to a word line WLbγ through a memory cell MCbγαβ.

A set of a plurality of memory cells MC connected to a plurality of transistors ST sharing one gate line SGL, respective bit lines BL, and one word line WL configure one cell set CU. The storage space provided by one cell set CU is referred to as a page. The data of each bit on one page of a certain cell set CU is stored in one memory cell MC in the cell set CU.

Figure 4:
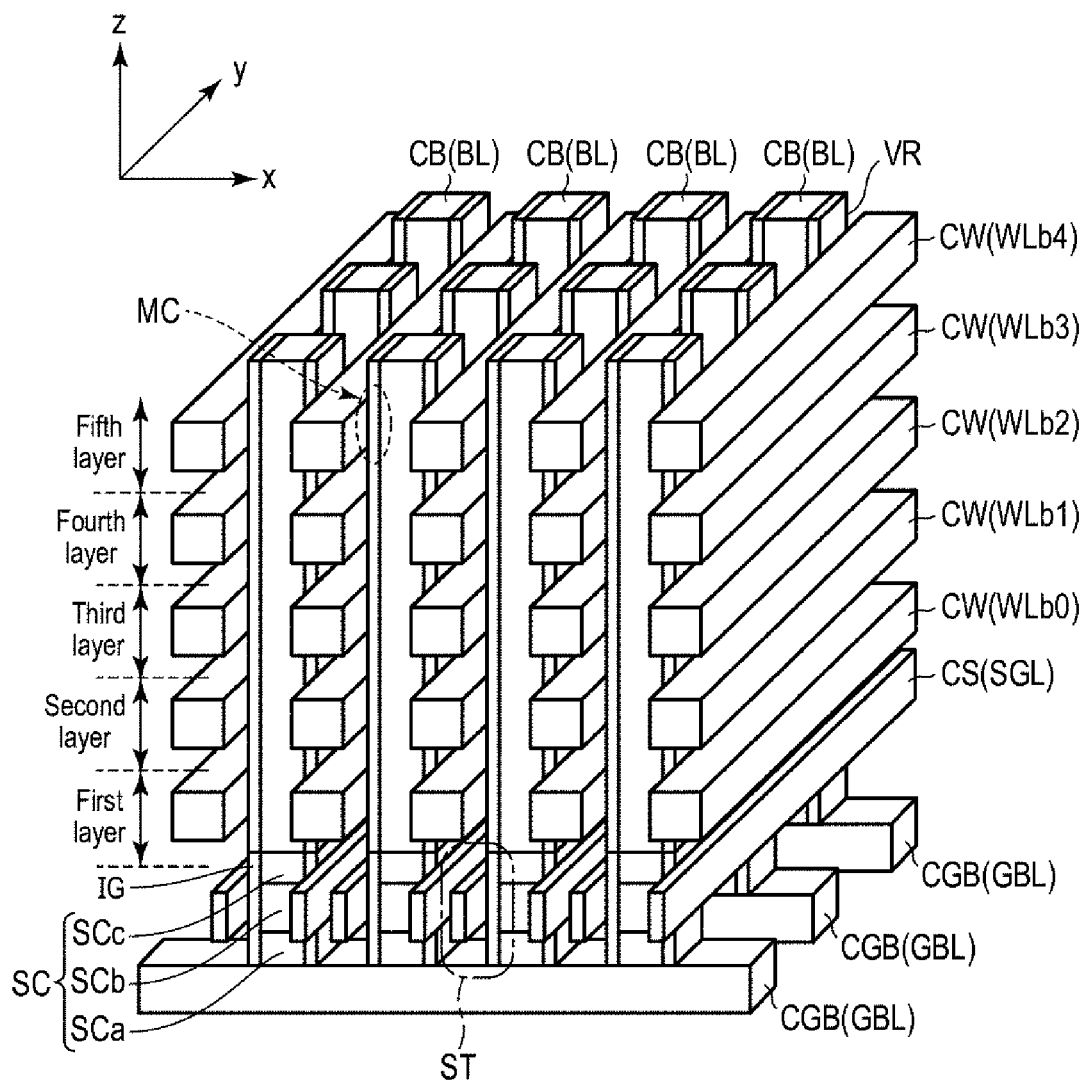
FIG. 4 is a view illustrating a three-dimensional memory cell array according to a first embodiment.

FIG. 4 is a view illustrating a part of a three-dimensional structure of part of the memory cell array 23 according to the first embodiment and illustrates a structure in a space defined by an x-axis, a y-axis, and a z-axis orthogonal to each other.

A plurality of conductors CGB are provided above the z-axis of a substrate. The conductors CGB extend along the x-axis and are spaced along the y-axis, each functioning as one global bit line GBL.

Semiconductors SC are provided on an upper surface of each conductor CGB. The semiconductors SC connected to one conductor CGB are arranged at intervals along the x-axis. The semiconductor SC includes silicon or is formed of silicon. In the respective semiconductors SC, an insulator IG is provided on two side surfaces facing each other along the x-axis. Each semiconductor SC includes a portion SCa, a portion SCb, and a portion SCc from below on the z-axis.

A plurality of conductors CS are provided above the conductor CGB. Two conductors CS are arranged at intervals between each pair of conductors CB that arranged on the x-axis. The conductors CS extend along the y-axis and are arranged at intervals along the x-axis. Each conductor CS functions as one gate line SGL and is in contact with one insulator IG, and the portion SCb of one semiconductor SC is interposed between the conductor CS and the insulator IG. One portion SCb, one conductor CS, and the insulator IG between the portion SCb and the conductor CS configure one transistor ST. Part of the portion SCa of one semiconductor SC and part of the portion SCc thereof function as a source region and a drain region of one transistor ST. Part of the portion SCb of one semiconductor SC functions as a channel region of one transistor ST.

Conductors CB are provided on an upper surface of the respective semiconductors SC. A plurality of the conductors CB extend along the z-axis, and each of the conductors CB functions as one bit line BL (BL0, BL1, ... ).

Resistance change layers VR are provided on two side surfaces of each conductor CB facing each other along the x-axis. The resistance change layer VR includes or is formed of a resistance-changing material that may have resistance of a continuously variable value. The resistance change material reaches a state with a lower resistance value when a voltage is applied thereto. When a current flows, the resistance change material is shifted to a state with a higher resistance value state. The resistance change material includes at least one of a material such as hafnium oxide ("HfO"), titanium dioxide ($TiO_2$), $ZnMn_2O_4$, nickel oxide ("NiO"), $SrZrO_3$, and $Pr_{0.7}Ca_{0.3}MnO_3$, and carbon. Further, the resistance change material includes at least one of silicon (Si) in a polycrystalline or amorphous state, germanium (Ge), silicon germanium ("SiGe"), gallium arsenide ("GaAs"), Indium phosphide ("InP"), gallium phosphide ("GaP"), gallium indium arsenic phosphide ("GaInAsP"), gallium nitride ("GaN"), silicon carbide ("SiC"), silicon oxide ("SiO"), silicon oxynitride ("SiON"), silicon nitride ("SiN"), HfSiO, and aluminum oxide ("AlO"). Further, the resistance change layer VR may include a structure in which layers of the materials listed above are stacked.

An electrode may be provided between the conductor CB and the resistance change layer VR. The electrode material may comprise metals such as Ag, Au, Ti, Ni, Co, Al, Fe, Cr, Cu, W, Hf, Ta, Pt, Ru, Zr, Ir, or nitride or carbide of one or more of these materials. Further, the electrode may be formed of polycrystalline silicon to which one or more of the materials listed above have been added.

Figure 5:
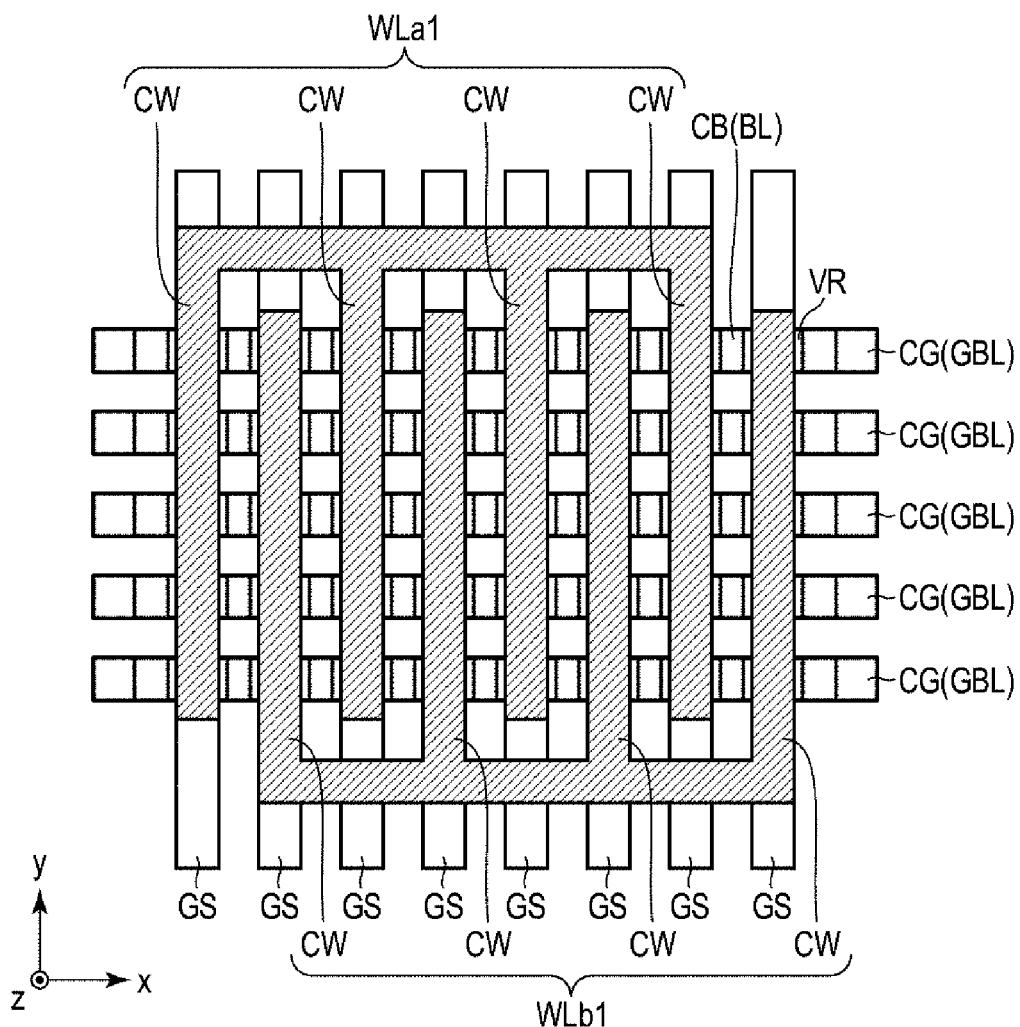
FIG. 5 depicts aspects of a part of a memory cell array according to a first embodiment.

A plurality of layers of conductors CW are provided above the conductor CS. Different layers are located at different coordinates along the z-axis. FIG. 4 illustrates an example of five layers, that is, an example where β=5, and a first layer to a fifth layer are arranged upward in this order along the z-axis. Each layer contains a plurality of conductors CW. The conductors CW extend along the y-axis and are arranged at intervals along the x-axis. Two conductors CW adjacent to each other in each layer have one conductor CB interposed therebetween and are respectively in contact with two resistance change layers VR on the conductor CB. A first set of the plurality of conductors CW, which is provided every other line of the conductors CW in each layer, is connected to each other at each first end of the conductor CW as illustrated in FIG. 5 illustrating a structure of a surface of the first layer along the x-axis and the y-axis, and the conductors CW and conductors connected thereto form a comb-shaped structure. Likewise, a second set of the plurality of conductors CW, which is provided every other line of the plurality of conductors CW in each layer, is connected to each other at each second end of the conductors CW as illustrated in FIG. 5, and the conductors CW and conductors connected thereto form a comb-shaped structure. In each case where γ is 0 to n (n is a natural number), the first set of conductors CW in the γ layer functions as a word line WLaγ, and the second set of conductors CW in the γ layer functions as a word line WLbγ. FIG. 5 illustrates a first layer.

Among the respective resistance change layers VR, a portion interposed between one conductor CW and one conductor CB functions as one memory cell MC.

Figure 6:
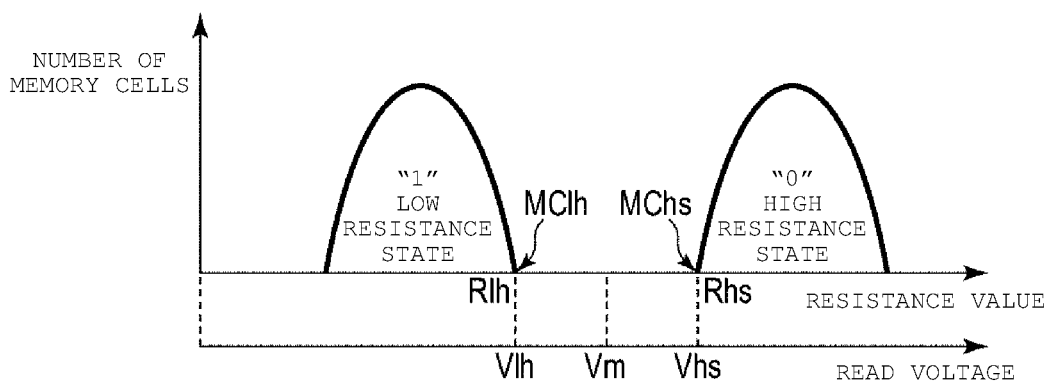
FIG. 6 is a graph illustrating a distribution of resistance values of memory cells and various read voltages, according to a first embodiment.

The memory cell MC is shifted to a low resistance state or a high resistance state by write. As illustrated in FIG. 6, data is written to the memory cells MC such that the memory cells MC in a low resistance state immediately after being written have a resistance value lower than a certain resistance value Rlh, and the memory cells MC in a high resistance state immediately after being written have a resistance value higher than a certain resistance value Rhs. Even the plurality of memory cells MC in a high resistance state may have different resistance values due to variations in characteristics of the memory cells MC, a sense amplifier, and wiring. Likewise, the plurality of memory cells MC in a low resistance state may have different resistance values. Accordingly, resistance values of the memory cells MC in the same resistance state form one distribution.

Among the plurality of memory cells MC in a low resistance state, a memory cell MClh having a maximum resistance value has the resistance value Rlh. Meanwhile, among the plurality of memory cells MC in a high resistance state, the memory cell MChs having a minimum resistance value has the resistance value Rhs. The SCM chip MD1 operates such that the resistance value Rlh and the resistance value Rhs of the plurality of memory cells MC immediately after being written have a large difference therebetween.

Figure 7:
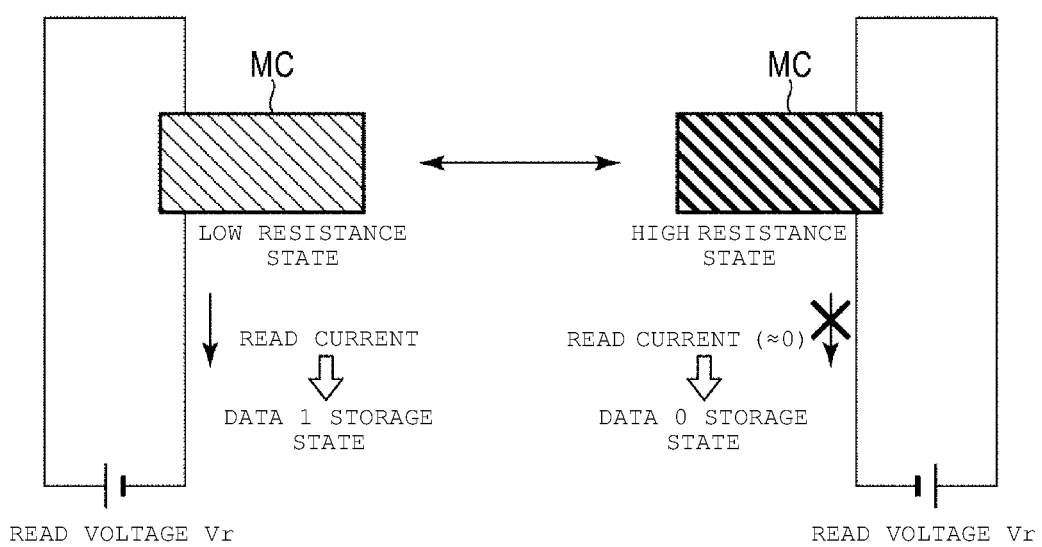
FIG. 7 is a diagram illustrating characteristics of a resistance state of memory cells according to a first embodiment.

The memory cells MC store data based on a resistance state, and thus resistance values of the memory cells MC are determined for reading the data. Accordingly, as illustrated in FIG. 7, a read voltage Vr of a certain magnitude is applied to the memory cell MC, and as a result, a resistance value of the memory cell MC is determined by the sense amplifier 28 based on a magnitude of a current flowing through the memory cell MC. Data is written such that two resistance value distributions are at intervals, and an appropriate read voltage Vr is used, and thereby, the sense amplifier 28 can determine which of the two resistance states the memory cell MC is in by applying the read voltage Vr. The memory cell MC in a low resistance state has a low resistance value similar to a resistance value of a conductor, and thus, when a read voltage Vr of a certain magnitude is applied, a read current of a certain magnitude or more flows through the memory cell MC. Meanwhile, the memory cell MC in a high resistance state has a high resistance value similar to a resistance value of an insulator, and thus, even when the read voltage Vr is applied the memory cell, a read current of a certain magnitude or less flows therethrough. The sense amplifier 28 determines that the memory cell MC stores 0 piece of data when the read current is less than or equal to a reference magnitude and determines that the memory cell MC stores 1 piece of data when the read current exceeds the reference magnitude. It may be treated that the memory cell MC in a resistance state in which a read current exceeding the reference magnitude flows stores 0 piece of data, and the memory cell MC in a resistance state in which a read current below the reference magnitude flows stores 1 piece of data.

As illustrated in FIG. 6, during a normal data read from the SCM chip MD1, a normal read voltage Vm is applied to the memory cell MC. The normal read voltage Vm has a magnitude between the read voltage Vlh and the read voltage Vhs. The read voltage Vlh has a magnitude in which, when the read voltage Vlh is applied to the memory cell MC in a low resistance state immediately after being written, a read current of a magnitude by which any memory cell in the low resistance state is determined to be in the low resistance state flows. The read voltage Vhs has a magnitude in which, when the read voltage Vhs is applied to the memory cell MC in a high resistance state immediately after being written, a read current of a magnitude by which any memory cell in the high resistance state is determined to be in the high resistance state flows. When a read voltage of lower than or equal to the read voltage Vlh is used for read of data, any memory cell MC including the memory cell MC with a maximum resistance value can be erroneously determined to be in a high resistance state. When a read voltage higher than or equal to the read voltage Vhs is used for read of data, any memory cell MC including the memory cell MChs with a minimum resistance value can be erroneously determined to be in a low resistance state.

Figure 8:
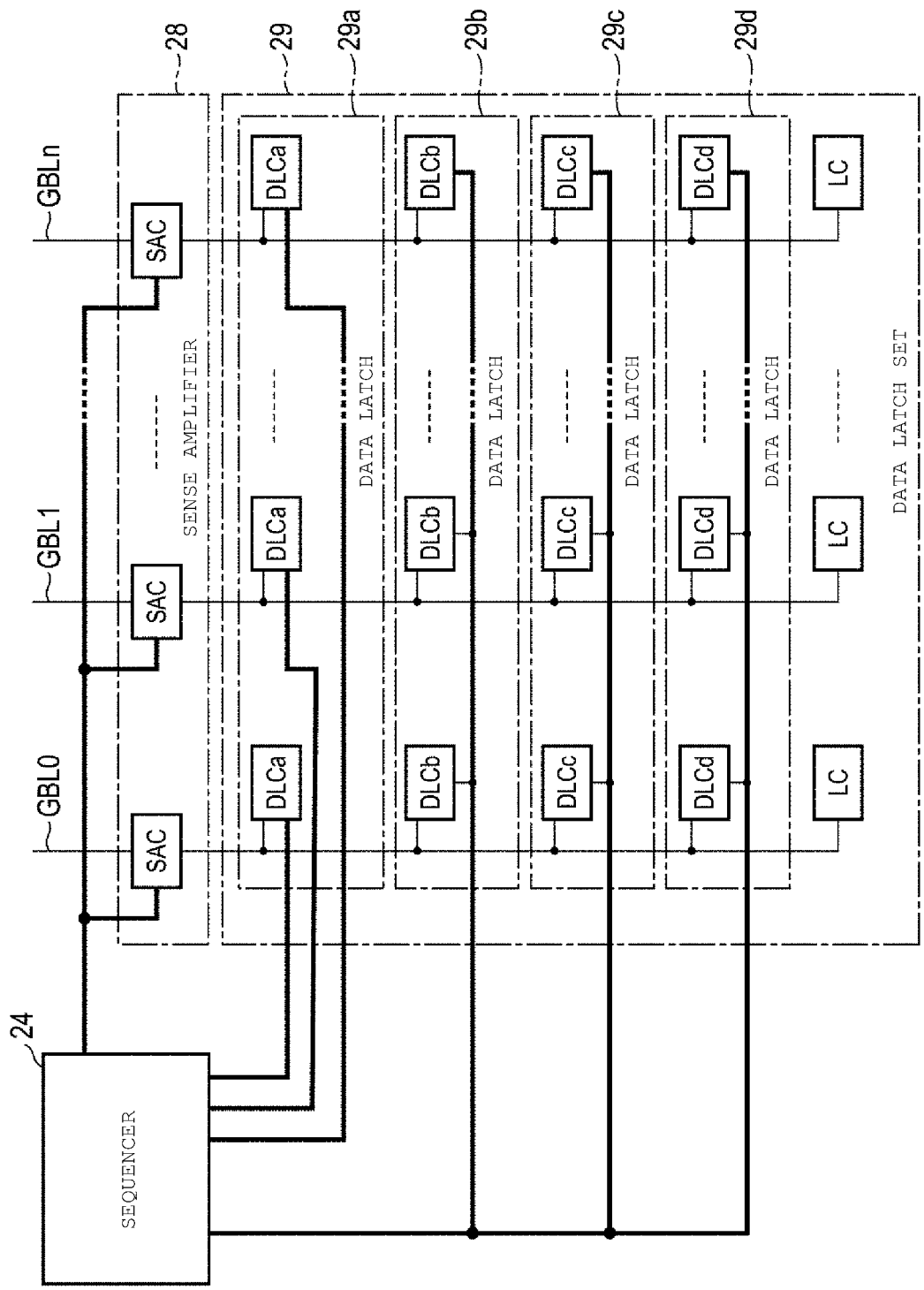
FIG. 8 is a diagram illustrating elements and connections of a sense amplifier and a data latch set according to a first embodiment.

FIG. 8 is a diagram illustrating elements and connections of the sense amplifier 28 and the data latch set 29. Bold lines in FIG. 8 transmit control signals.

The sense amplifier 28 includes n+1 sense amplifier circuits SAC. The sense amplifier circuits SAC have the same set of elements and connections and are respectively connected to the global bit line GBL (GBL0, GBL1, . . . ). When reading data, each of the sense amplifier circuits SAC is electrically connected to one memory cell MC of a read target via one global bit line GBL and one bit line BL connected (corresponding) to the sense amplifier circuit SAC. Then, each of the sense amplifier circuits SAC senses a current of a corresponding bit line BL and determines which of the two resistance states the corresponding memory cell MC belongs to based on the sensed result. Each of the sense amplifier circuits SAC stores data 0 or data 1 based on the two resistance states as the sensed result.

The data latch set 29 includes data latches 29a, 29b, 29c, and 29d, and a plurality of arithmetic circuits LC. Each of the data latches 29a, 29b, 29c, and 29d can store data of one page size. The data latch 29a includes n+1 data latch circuits DLCa. The data latch 29b includes n+1 data latch circuits DLCb. The data latch 29c includes n+1 data latch circuits DLCc. The data latch 29c includes n+1 data latch circuits DLCd. The data latch circuits DLCa, DLCb, DLC, and DLCd are referred to as data latch circuits DLC when there is no need to be distinguished from each other. Each data latch circuit DLC can store data of 1 bit.

The data latch 29d is used for input and output of data between the SCM controller 2 and the SCM chip MD1. Data received from the SCM controller 2 is first input to the data latch 29d, and data output from the SCM chip MD1 is transmitted from the data latch 29d.

One data latch circuit DLC of each of the data latches 29a, 29b, 29c, and 29d is connected to one sense amplifier circuit SAC. The sense amplifier circuit SAC and the data latch circuits DLCa, DLCb, DLCc, and DLCd connected to each other are treat bits at the same position in data of one page size of the sense amplifier 28 and each of the data latches 29a, 29b, 29c, and 29d, respectively.

Figure 9:
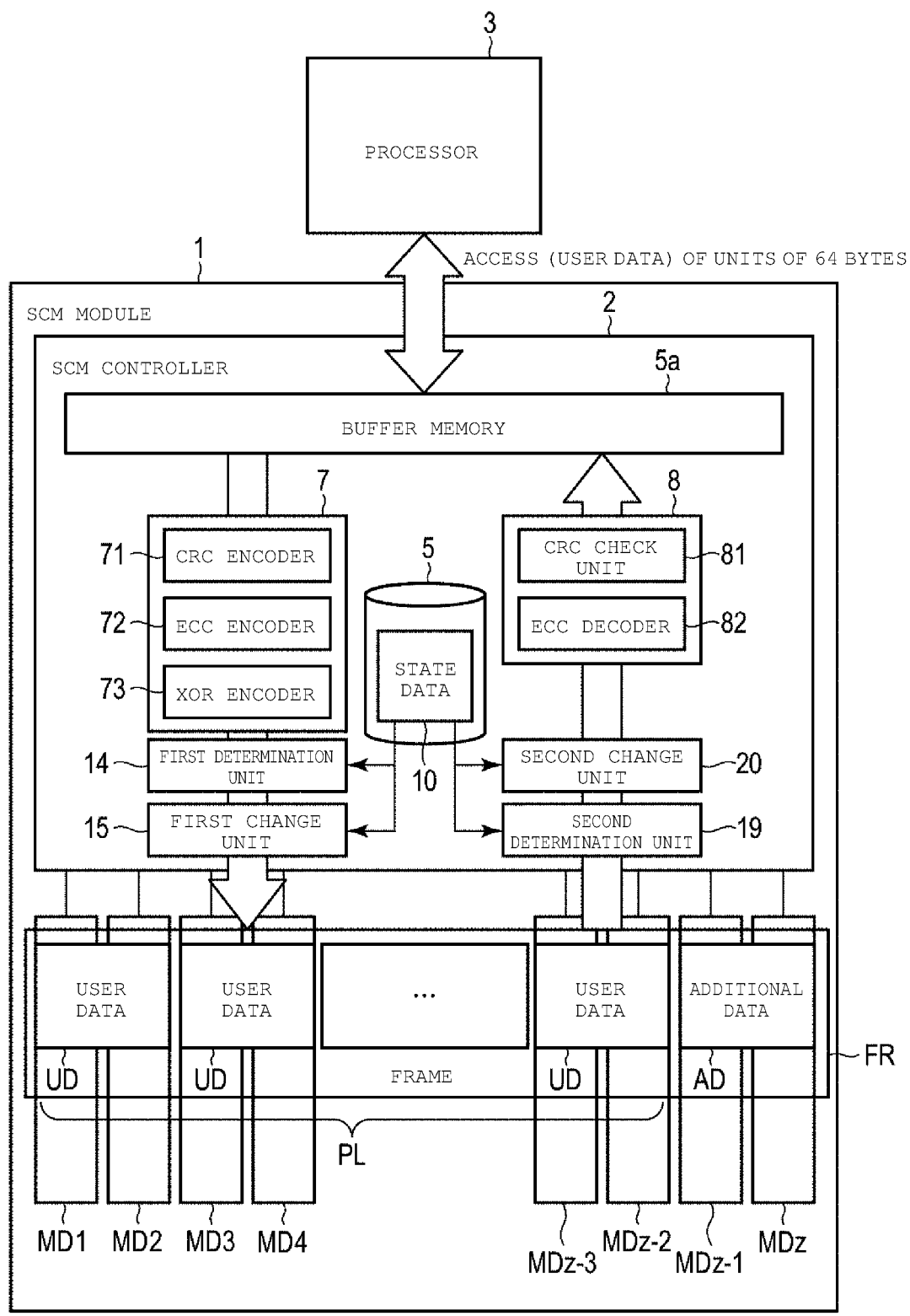
FIG. 9 is a diagram illustrating an example of a relationship between a plurality of SCM chips and a frame according to a first embodiment.

FIG. 9 is a diagram illustrating an example of the relationship between the SCM chips MD1 to MDz and a frame FR written to the SCM chips MD1 to MDz. FIG. 9 illustrates only the buffer memory 5a, the state data 10 of the memory unit 5, the encoder 7, the decoder 8, the first determination unit 14, the first change unit 15, and the second determination unit 19, and the second change unit 20 as elements in the SCM controller 2, and other elements are omitted. Further, in the following description, the read data can be error-corrected by the ECC decoder 82, and a case where chip failure does not occur in the SCM chips MD1 to MDz will be described as an example, and thus, the XOR decoder 83 in the decoder 8 is omitted.

In the first embodiment, it is assumed that the frame FR includes a payload portion PL that collects user data UD until reaching a predetermined size (or a predetermined number), and additional data AD corresponding to the payload portion PL.

In the first embodiment, the processor 3 is assumed to issue read and write requests the SCM module 1 in the unit of 64 bytes.

The SCM controller 2 writes the user data UD received from the processor 3 to the buffer memory 5a during a write operation. The SCM controller 2 starts to generate the frame FR when a set of the user data UD stored in the buffer memory 5a has the predetermined size for generating the frame FR.

The encoder 7 encodes the payload portion PL by using the CRC encoder 71, the ECC encoder 72, and the XOR encoder 73, and generates the additional data AD for the payload portion PL.

In the first embodiment, the additional data AD includes, for example, CRC code information, an ECC parity, and an XOR parity. However, the XOR parity need not included in the additional data AD, a frame and the corresponding XOR parity can be managed separately, and at least one of the SCM chips MD1 to MDz may be used for storing the XOR parity.

The first determination unit 14 determines whether or not to change the bit order of the frame FR based on the state data 10 including the state information such as the number of writes to write destinations for the frame FR.

When it is determined to change the bit order of the frame FR, the first change unit 15 changes the bit order of the frame FR based on the state data 10.

Then, the SCM controller 2 writes the frame FR having the changed bit order to the plurality of SCM chips MD1 to MDz.

When updating part of the payload portion PL included in the frame FR with new data, the SCM controller 2 recalculates the parity and then rewrites the part of the payload portion PL and the part of the additional data AD that needs to be rewritten to reflect the new data by using the second read-modify-write operation.

In the second read-modify-write operation, the SCM controller 2 may read a frame from the SCM chips MD1 to MDz and then rewrite just the portions that have been changed by the update.

Alternatively, the first read-modify-write operation may be performed by rewriting the updated portions in the SCM chips MD1 to MDz.

The SCM controller 2 reads the frame FR from the plurality of SCM chips MD1 to MDz during a read operation.

The second determination unit 19 determines whether or not to change (that is, restore to the original state) the bit order of the frame FR based on, for example, the state data 10.

When it is determined to change the bit order of the frame FR, the second change unit 20 changes the bit order of the frame FR based on the state data 10.

The ECC decoder 82 of the decoder 8 performs error detection and error correction for the frame FR based on the ECC parity included in the additional data AD, and the CRC decoder 81 of the decoder 8 performs error detection for the frame FR based on the CRC code information included in the additional data AD in the frame FR. When determining that there is no error in the frame FR, the decoder 8 writes the payload portion PL to the buffer memory 5a.

Then, the SCM controller 2 transmits the user data UD included in the payload portion PL to the processor 3.

Figure 10:
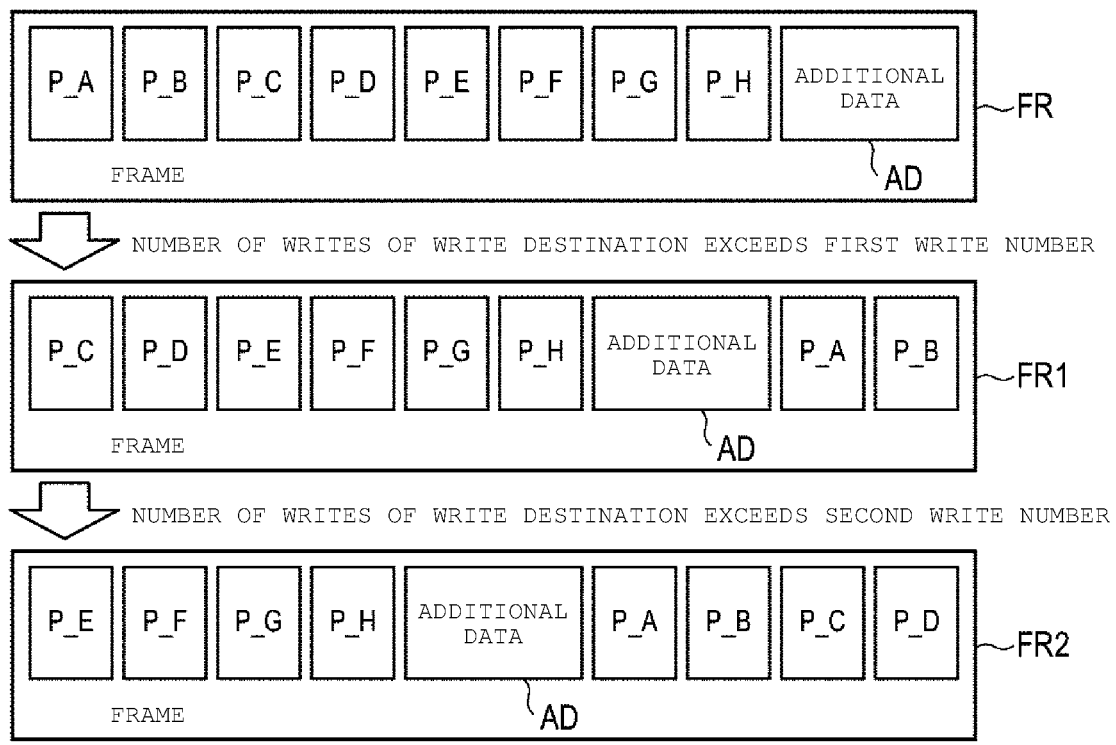
FIG. 10 is a diagram illustrating an example of a change state of a bit order of a frame according to a first embodiment.

FIG. 10 is a diagram illustrating an example of the change state of the bit order of the frame FR.

In the first embodiment, as described above, the bit order of the frame FR is changed based on the number of writes to write destinations and the like.

More specifically, in the frame FR, in which the number of writes to the write destination is less than or equal to the first number of writes, data of the frame FR is arranged in the order of data P_A to P_H and additional data AD from the left to the right. The frame FR is written to the SCM chips MD1 to MDz in this state.

When the number of writes to the write destination exceeds the first number of writes (for example, 1000 times), data of the frame FR is shifted by the amount of two chips and a frame FR1 is generated. The data of the frame FR1 is arranged in the order of data P_C to P_H, additional data AD, and data P_A to P_B from the left to the right. The frame FR1 is written to the SCM chips MD1 to MDz in a state in which the bit order is shifted by the amount of two chips from the state of the frame FR.

When the number of writes to the write destination exceeds the second number of writes (for example, 2000 times), data of the frame FR1 is further shifted by the amount of two chips from the state of the frame FR1, and a frame FR2 is generated. The data of the frame FR2 is arranged in the order of data P_E to P_H, additional data AD, and data P_A to P_D from the left to the right. The frame FR2 is written to the SCM chips MD1 to MDz in a state in which the bit order is shifted by the amount of four chips from the state of the frame FR.

Hereinafter, likewise, as the number of writes to write destinations of the frame FR increases, the bit order of the frame FR is changed.

FIG. 10 and description thereof are examples, and how to change the bit order and what conditions have to be satisfied to change the bit order can be changed as appropriate.

It is assumed a case where unexpected shutdown occurs in the SCM module 1 and the latest state information is not non-volatilized. In this case, the latest state information managed by the SCM controller 2 is volatilized. Then, even when the SCM module 1 restarts up, the state information remains as it is, and the SCM controller 2 cannot change a read frame to the correct bit order. Therefore, in the first embodiment, when changing the bit order of a frame as illustrated in FIG. 10, the processing unit 6 of the SCM controller 2 non-volatilizes state information corresponding to the frame by storing the state information in, for example, the SCM chips MD1 to MDz or the like.

As illustrated in FIG. 10, when writing the frame to the SCM chips MD1 to MDz, the SCM module 1 changes the bit order of the frame FR according to the number of writes to write destinations. More specifically, the SCM module 1 changes positions or the order of the payload portion PL and the additional data AD.

The SCM module 1 may determine or change the number of bits (level at which bits are circulated) to shift positions, such as the unit of the user data UD, the unit smaller than the user data UD, the unit larger than the user data UD, and the unit of chips in consideration of the bias of internal wear-out of the payload portion PL.

However, it is assumed that the SCM module 1 does not change the bit order of a frame for system management information.

For example, when receiving a write request for sequential addresses for the user data UD of 64 bytes from the processor 3, the SCM module 1 may skip a process of the first determination unit 14 and a process of the first change unit 15. In this case, the SCM module 1 generates a frame based on the consecutively received user data UD and writes the generated frame to the SCM chips MD1 to MDz without determining and changing a bit order of the frame.

Figure 11:
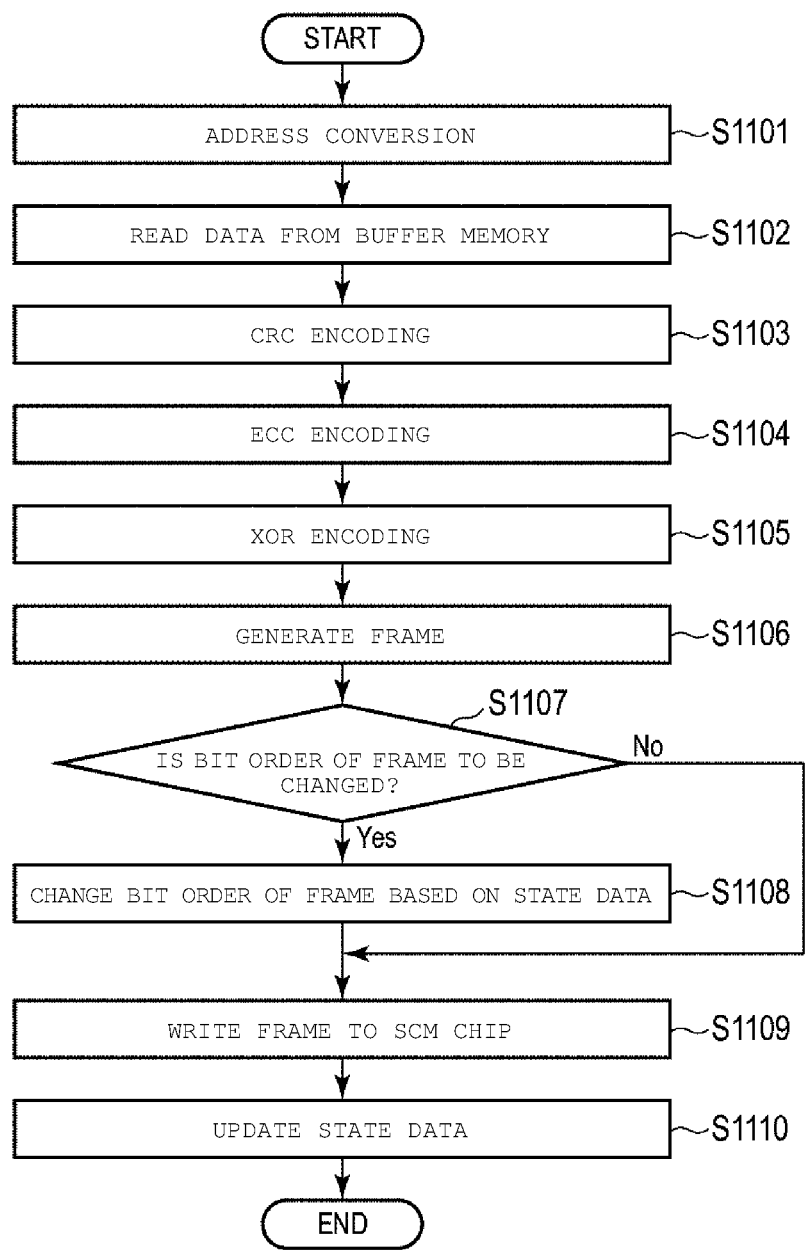
FIG. 11 is a flowchart illustrating an example of a write operation of a frame performed by a SCM module according to a first embodiment.

FIG. 11 is a flowchart illustrating an example of a write operation of the frame FR performed by the SCM module 1 according to the first embodiment. FIG. 11 is performed when the predetermined number of user data UD for generating the frame FR is stored in the buffer memory 5a or the like.

In S1101, the address conversion unit 11 converts the logical address of a write destination into the physical address of a write destination based on the address conversion table AT.

In S1102, the first read control unit 12 reads the predetermined number of user data UD for generating the frame FR from the buffer memory 5a.

In S1103, the encoding control unit 13 performs CRC encoding of the user data UD by using the CRC encoder 71 and generates the CRC code information.

In S1104, the encoding control unit 13 performs ECC encoding of the user data UD by using the ECC encoder 72 and generates the ECC parity corresponding to the user data UD.

In S1105, the encoding control unit 13 calculates XOR of the user data UD and the ECC parity by using the XOR encoder 73 to generate the XOR parity.

In S1106, the encoding control unit 13 generates a frame including the user data UD and the additional data including the CRC code information, the ECC parity, and the XOR parity.

In S1107, the first determination unit 14 determines whether or not to change the bit order of the generated frame FR based on the number of writes to write destinations of the frame FR included in the state data 10.

When the bit order of the generated frame FR is not changed (No in S1107), the process moves to S1109.

When changing the bit order of the generated frame FR (Yes in S1107), the first change unit 15 changes the bit order of the frame FR based on the number of writes to write destinations of the frame FR included in the state data 10 in S1108.

In S1109, the first write control unit 16 writes the generated frame FR or the frame FR having the changed bit order to the write destinations of the SCM chips MD1 to MDz.

In S1110, the update unit 17 updates the state data 10 so as to increase the number of writes to the write destinations.

Figure 12:
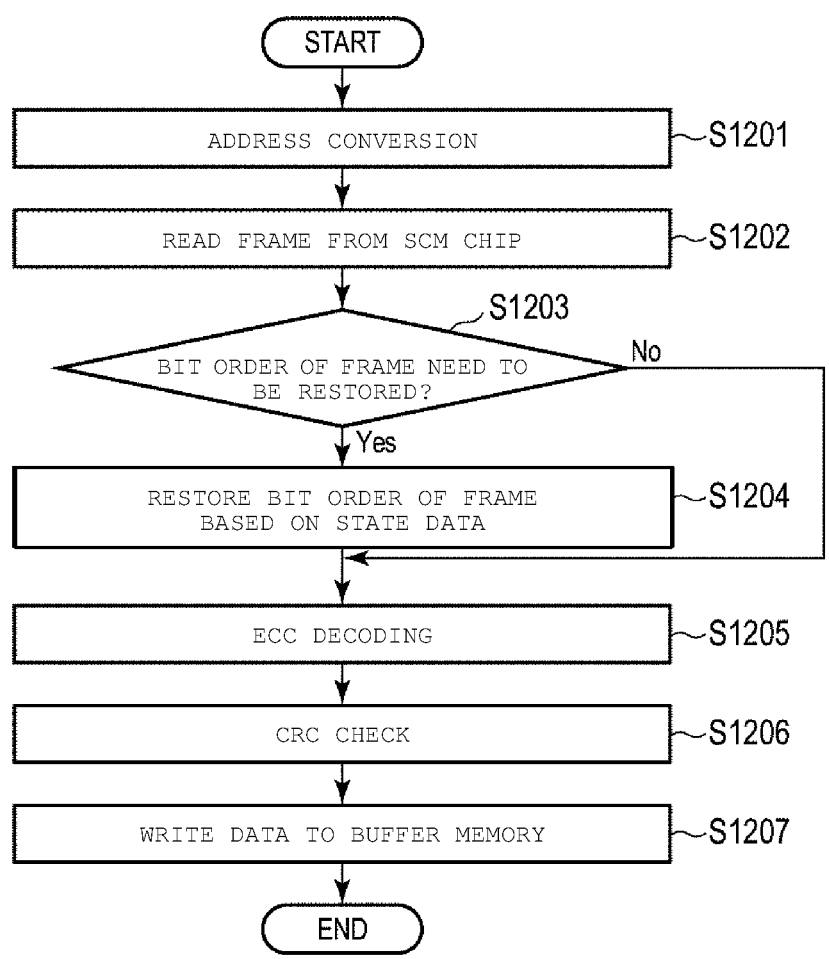
FIG. 12 is a flowchart illustrating an example of a read operation of a frame performed by a SCM module according to a first embodiment.

FIG. 12 is a flowchart illustrating an example of a read operation performed by the SCM module 1 according to the first embodiment.

In S1201, the address conversion unit 11 converts the read target logical address into the read target physical address based on the address conversion table AT.

In S1202, the second read control unit 18 reads the frame FR from the position indicated by the read target physical address of the SCM chips MD1 to MDz.

In S1203, the second determination unit 19 determines whether or not to change the bit order of the read frame FR based on number of writes included in the state data 10 and corresponding to the positions of the read targets of the SCM chips MD1 to MDz.

When the bit order of the read frame FR is not changed (No in S1203), the process moves to S1205.

When changing the bit order of the read frame FR (Yes in S1203), the second change unit 20 changes (restores to the original state) the bit order of the frame FR based on the number of writes included in the state data 10 and corresponding to the positions of the read targets of the SCM chips MD1 to MDz in S1204.

In S1205, the decoding control unit 21 performs ECC decoding of the read frame FR or the frame FR having the changed bit order by using the ECC decoder 82.

In S1206, the decoding control unit 21 performs CRC check on the read frame FR or the frame FR having the changed bit order by using the CRC check unit 81.

In S1207, the second write control unit 22 writes the predetermined number of user data UD included in the frame FR for which error detection and error correction are performed to the buffer memory 5a.

The effects obtained by the SCM module 1 according to the first embodiment described above will be described.

When the SCM chips MD1 to MDz perform the first read-modify-write operation, bit inversion occurs in memory cells, the number of writes to the memory cells increase, and wear-out of the memory cells progresses. As the memory cells are worn out, the lifetimes of the SCM chips MD1 to MDz are shortened. Further, the frame FR stored in the SCM chips MD1 to MDz includes the payload portion PL and the additional data AD, and further, the additional data AD includes CRC code information, an ECC parity, and an XOR parity. The additional data AD needs to be updated each time part of the payload portion PL is updated. Accordingly, the memory cells storing the additional data AD generally will wear out faster than the memory cells storing the payload portion PL of the frame FR.

Therefore, when the bit order of the frame FR is fixed, the memory cells of a write destination of the additional data AD will be worn out faster than the memory cells of a write destination of the payload portion PL, and durability of the memory cells included in the SCM chips MD1 to MDz thus varies accordingly.

In contrast, the SCM module 1 according to the first embodiment changes the bit order of the frame FR, and thus, wear-out of the memory cells of the SCM chips MD1 to MDz is leveled (equalized), and durability of the SCM chips MD1 to MDz is improved and the lifetimes thereof are extended.

Figures 13, 14:
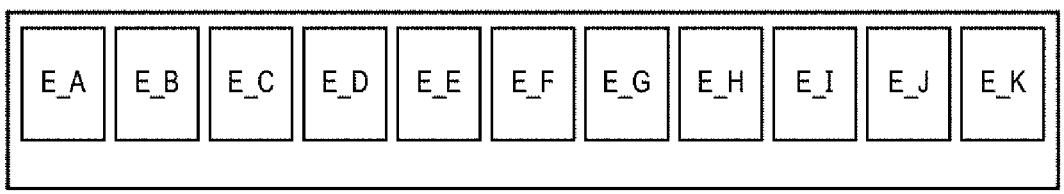
FIG. 13 is a diagram illustrating an example of a write destination area of a frame in a plurality of SCM chips.
FIG. 14 is a diagram illustrating an example of an address conversion table according to a second embodiment.

FIG. 13 is a diagram illustrating an example of write destination areas E_A to E_K of one frame FR in the SCM chips MD1 to MDz. In the first embodiment, it is assumed that these areas refer to a set of memory cells.

The frame FR is written to each of the write destination areas E_A to E_K included in each of, for example, 11 SCM chips MD1 to MD11.

Each of the write destination areas E_A to E_K may be, for example, 32 bytes. In this case, one piece of the user data UD of 64 bytes is written to two of the write destination areas E_A to E_K.

When a bit order of the frame FR is fixed, the payload portion PL of the frame FR is written to eight write destination areas E_A to E_H. When the bit order of the frame FR is fixed, the additional data AD of the frame FR is written to three write destination areas E_I to E_K.

When the bit order of the frame FR is fixed, the frequency of updates of the chips to which the additional data AD is written among the SCM chips MD1 to MDz is more than the frequency of updates of the chips to which the payload portion PL is written, and wear-out of the memory cells of the chips to which the additional data AD is written progresses faster.

Further, when there is a local bias in write access to a plurality of pieces of the user data UD included in the payload portion PL of the frame FR, wear-out of the memory cells corresponding to the user data UD with a high access frequency progresses.

Further, in the SCM module which does not include an encryption device and in which the bit order of the frame FR is fixed, wear-out of the plurality of pieces of user data UD can be biased.

However, in the SCM module 1 according to the first embodiment, the bit order of the frame FR written to the plurality of SCM chips MD1 to MDz is changed. As a result, the number of writes to, for example, 11 write destination areas E_A to E_K, which are the write destinations of the frame FR, is leveled. Thereby, in the first embodiment, wear-out of the memory cells of the plurality of SCM chips MD1 to MDz can be leveled, and durability of the SCM chips MD1 to MDz can be improved and the lifetimes thereof are extended.

In particular, when the second read-modify-write operation is performed, wear-out of the additional data AD of the frame FR tends to progress, but the SCM module 1 according to the first embodiment changes the bit order of the frame FR, and thus, the wear-out of memory cells of the SCM chips MD1 to MDz can be leveled.

In the first embodiment, since the wear-out of the SCM chips MD1 to MDz can be leveled, the frequency of wear leveling processes for the SCM chips MD1 to MDz can be reduced, and process efficiency of the SCM module 1 can be increased.

For example, system management information may be used by the SCM controller 2 between the time when the SCM controller 2 starts up and the time when a process of restoring the bit order to the original state can be performed. In the first embodiment, a frame including the system management information is excluded from the target for changing the bit order. Accordingly, the SCM controller 2 reads a frame including the system management information from the SCM chips MD1 to MDz even between the time when the SCM controller 2 starts up and the time when the process of restoring the bit order to the original state and can use the system management information.

In the first embodiment, a case where the bit order of the system management information is not changed is described. When the bit order of the system management information is not changed, memory cells may be prevented from being worn by reducing the number of writes, the frequency of writes, or the like related to the system management information by using another method.

Here, a method of reducing the number of writes related to the system management information will be specifically described. The SCM controller 2 recognizes the types of data written to the SCM chips MD1 to MDz and the type of read data read from the SCM chips MD1 to MDz. Further, the SCM controller 2 can also determine the physical address which is the write destination of data. Therefore, when writing a frame including the system management information to any of the SCM chips MD1 to MDz, the SCM controller 2 appends the frame including the system management information according to consecutive physical addresses. As such, by adding the system management information to consecutive addresses, memory cells can be prevented from being worn out due to repetitive writes of the system management information to the same write destination.

For example, the SCM module 1 writes back the state data 10, which is a type of system management information, from the memory unit 5 to the SCM chips MD1 to MDz only when the order of the frame including the user data is changed. In some examples, the SCM module 1 may not write back the state data 10 from the memory unit 5 to the SCM chips MD1 to MDz if the bit order has not been changed. As such, by volatilizing the state data 10 when the bit order is not changed, the number of writes of the state data 10 to the SCM chips MD1 to MDz can be reduced.

When the SCM module 1 is connected to a battery with large capacity, such as an uninterruptible power supply, the SCM module 1 may write the system management information to the SCM chips MD1 to MDz once before shutdown. Thereby, the number of writes of the system management information to the SCM chips MD1 to MDz can be reduced.

In the first embodiment, a case where various elements for changing the bit order of the frame FR are provided in the SCM controller 2 is described as an example. However, the SCM chips MD1 to MDz may change the bit order for data assigned to each of the SCM chips.

In the first embodiment, the SCM controller 2 switches change or non-change of the bit order of a frame by determining whether or not the type of data is system management information. However, the type of data for switching between change and non-change of the bit order is not limited to system management information. The SCM controller 2 may switch change or non-change of the bit order by determining whether or not data is another type of data.

In the first embodiment, a case where α unit of management (management unit) for a wear leveling process is one frame and the state information is managed for each frame is described as an example. However, the management unit for the wear leveling process can be a plurality of frames (for example, four frames), and state information corresponding to the plurality of frames may be managed. It is assumed that the SCM controller 2 repeatedly receives a write request for a specific frame having the same logical address from the processor 3. In this case, in addition to the specific frame, the SCM controller 2 reads other frames (for example, three frames) corresponding to the same state information as the specific frame from the SCM chips MD1 to MDz. Then, the SCM controller 2 changes bit orders of the specific frame and the other frames based on the state information and writes the specific frame and the other frames having changed bit orders to the SCM chips MD1 to MDz. Thereby, even when state information is managed for each of a plurality of frames, wear-out of memory cells of the SCM chips MD1 to MDz can be leveled, and the lifetimes of the SCM chips MD1 to MDz can be extended.

Second Embodiment

In a second embodiment, it will be described that the bit order of a frame is changed when the wear leveling process of the SCM controller 2 is performed. In the second embodiment, it is assumed that the wear leveling process is a process in which data of an area where wear-out progresses (for example, the number of writes is relatively high) is moved to an area where wear-out has not yet progressed as much (for example, the number of writes is relatively low), for the SCM chips MD1 to MDz. By performing a wear leveling process for the SCM chips MD1 to MDz, the lifetimes of the SCM chips MD1 to MDz can be extended.

FIG. 14 is a diagram illustrating an example of an address conversion table AT1 according to the second embodiment. The address conversion table AT1 corresponds to the address conversion table AT and the state data 10 described in the first embodiment.

The address conversion table AT1 associates a logical address LA and a physical address PA and bit order information BOI with each other.

The bit order information BOI is information indicating the change pattern of the bit order of the frame FR written to the position indicated by the physical address PA. By referring to the bit order information BOI, the bit order of data read from the position indicated by the physical address PA can be returned to the original state.

The bit order information BOI may be determined, for example, by randomly selecting a specific order change pattern from a plurality of order change patterns.

The bit order information BOI may be determined based on a function or a table.

Figure 15:
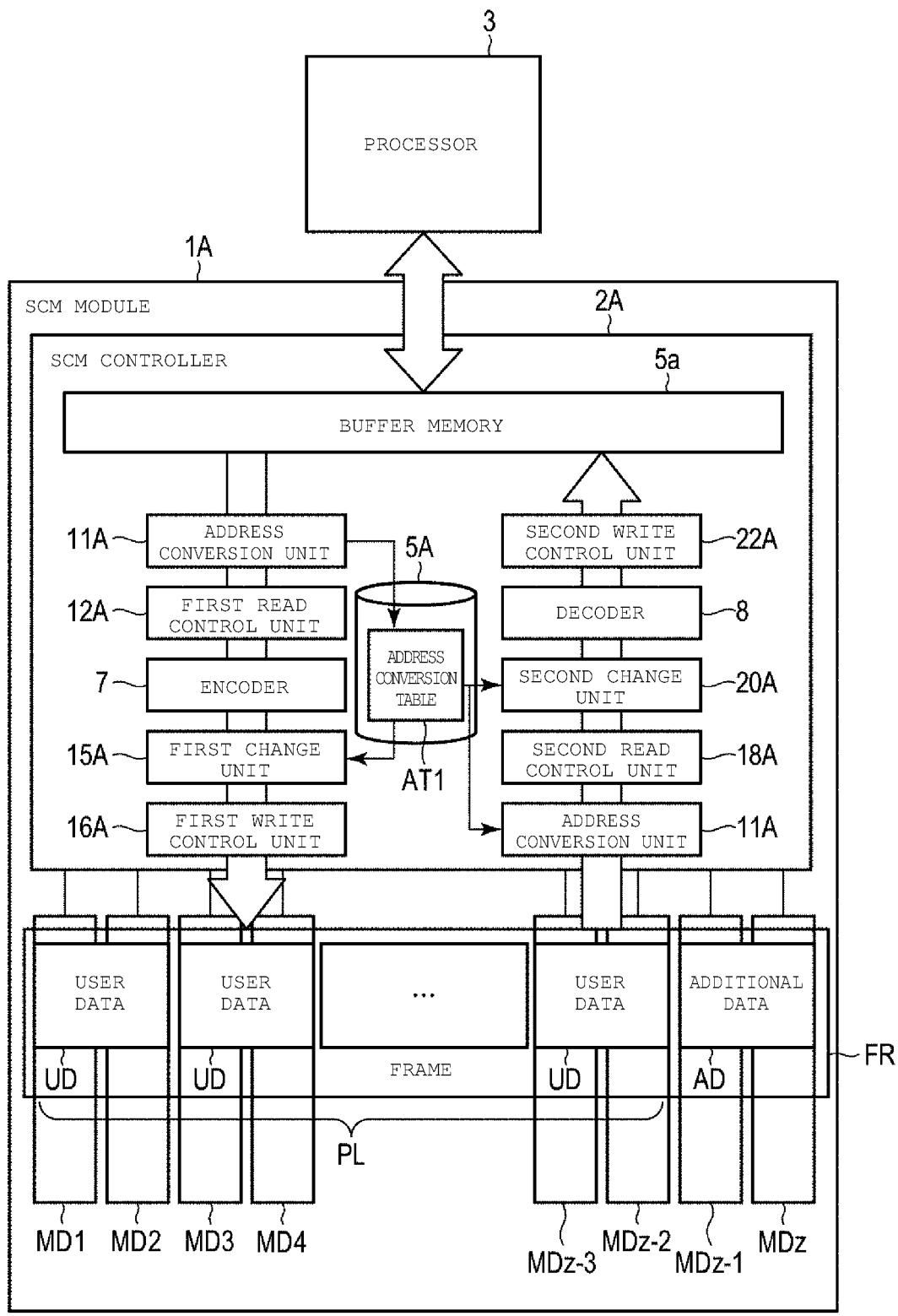
FIG. 15 is a block diagram illustrating an example of a configuration of an SCM module according to a second embodiment.

FIG. 15 is a block diagram illustrating an example of a configuration of an SCM module 1A according to the second embodiment.

An SCM controller 2A of the SCM module 1A includes a memory unit 5A, a buffer memory 5a, an address conversion unit 11A, a first read control unit 12A, an encoder 7, a first change unit 15A, a first write control unit 16A, and a second read control unit 18A, a second change unit 20A, a decoder 8, and a second write control unit 22A. In FIG. 15, other elements of the SCM controller 2A are omitted. The address conversion unit 11A, the first read control unit 12A, the first change unit 15A, the first write control unit 16A, the second read control unit 18A, the second change unit 20A, and the second write control unit 22A may be implemented as a processing unit in the SCM controller 2A executes firmware stored in the memory unit 5A.

The memory unit 5A stores the address conversion table AT1.

The address conversion unit 11A registers the logical address of a write destination, the physical address of the write destination, and the bit order information in the address conversion table AT1 in association with each other during a write operation at the time of the wear leveling process.

The first read control unit 12A reads user data UD from the buffer memory 5a during the write operation.

The encoder 7 performs encoding for the user data UD read from the buffer memory 5a and generates a frame FR of a write target including the user data UD and the additional data AD.

The first change unit 15A changes the bit order of the frame FR of the write target based on the bit order information BOI with reference to the address conversion table AT1.

Then, the first write control unit 16A writes the frame FR having the changed bit order to the position corresponding to the physical address of the write destination in the SCM chips MD1 to MDz.

During a read operation, the address conversion unit 11A of the SCM controller 2A converts a logical address of a read target into a physical address of the read target based on the address conversion table AT1.

The second read control unit 18A reads the frame FR from the position indicated by the physical address of the read target in the plurality of SCM chips MD1 to MDz.

The second change unit 20A restores the bit order of the frame FR to the original state based on the bit order information BOI corresponding to the physical address of the read target with reference to the address conversion table AT1.

The decoder 8 performs decoding for the frame FR having the bit order restored to the original state.

Then, the second write control unit 22A writes the user data UD included in the frame FR to the buffer memory 5a.

In the SCM module 1A according to the second embodiment described above, the bit order information BOI is associated with the logical address LA or the physical address PA of the address conversion table AT1. Then, the SCM module 1A changes the order of the frame FRs based on the bit order information BOI during a write operation at the time of performing the wear leveling process and the read operation.

Thereby, wear-out of memory cells can be leveled in the plurality of SCM chips MD1 to MDz, and durability of the SCM chips MD1 to MDz can be improved and the lifetimes thereof can be extended.

The change in the bit order of the frame FR described in the first and the second embodiments may be applied when a read operation and a write operation occur during a background process of the SCM modules 1 and 1A. For example, when the wear leveling process is performed as the background process, the bit order of the frame FR may be changed. Further, when garbage collection or compaction is performed as the background process, the bit order of the frame FR may be changed. The garbage collection is a process in which data fragmentarily arranged (stored) in a garbage collection source area in the SCM chips MD1 to MDz is collectively rearranged (rewritten) in a garbage collection destination area, and data of the garbage collection source area is disabled (invalidated). Garbage collection may also be referred to as compaction.

In the first and the second embodiments, whether or not to change the bit order is determined for each frame FR, and the bit order is changed for one frame FR at a time. However, when a unit of management (management unit) of the SCM chips MD1 to MDz is larger than the frame size, state information may be managed in units of a plurality of frames, so whether or not to change the bit order may likewise be determined in the unit of the plurality of frames, and the bit order may be changed for multiple frames.

In the first and second embodiments, the SCM controllers 2 and 2A may detect whether or not areas of the SCM chips MD1 to MDz get out of order by using the decoding control unit 21 and the decoder 8. When detecting failure of a memory cell in an area, the SCM controllers 2 and 2A may use another area of the SCM chips MD1 to MDz instead of the area of which failure is detected.

In the first and second embodiments, the first write control units 16 and 16A may write frames to a plurality of SCM chips MD1 to MDz by the multicast method. Further, the second read control units 18 and 18A may read frames written by multicast from the plurality of SCM chips MD1 to MDz. A specific example of a case where the multicast is used will be described in a fourth embodiment to be described below.

In the first and second embodiments, the second change units 20 and 20A may change the bit order of part of at least one read frame. The decoder 8 may decode part of at least one read frame. The second write control units 22 and 22A may write part of the decoded frame to the buffer memory 5a and discard the other portions. Thereby, load of the SCM controllers 2 and 2A can be prevented from increasing.

In the first and second embodiments, a case where the frame FR is written to and read from a plurality of SCM chips MD1 to MDz is described as an example. However, the first and second embodiments may be applied when the SCM controllers 2 and 2A write and read the frame FR to and from one SCM chip. For example, when the SCM controllers 2 and 2A write and read the frame FR to and from a plurality of pages in one SCM chip, the processes described in the first and second embodiments may be applied.

In the first and second embodiments, the SCM controllers 2 and 2A may be applied when the frame FR is written to and read from two or more pages in each of the multiple SCM chips MD1 to MDz. Description is made more specifically with reference to FIGS. 9 and 15. When the SCM controllers 2 and 2A write and read each of a plurality of pieces of the user data UD and the additional data AD included in the frame FR are stored to and from an area of the amount of two pages in each of the SCM chips MD1 to MDz, the processes described in the first and second embodiments may be applied.

Third Embodiment

The third embodiment is a modification example of the first and second embodiments. The third embodiment describes a modification of the first embodiment as an example, but, in general, the same modification can also be applied to the second embodiment.

In the third embodiment, a parity frame including a vertical parity for a plurality of frames is generated, and arrangement of the plurality of frames and the parity frame is shifted.

Figure 16:
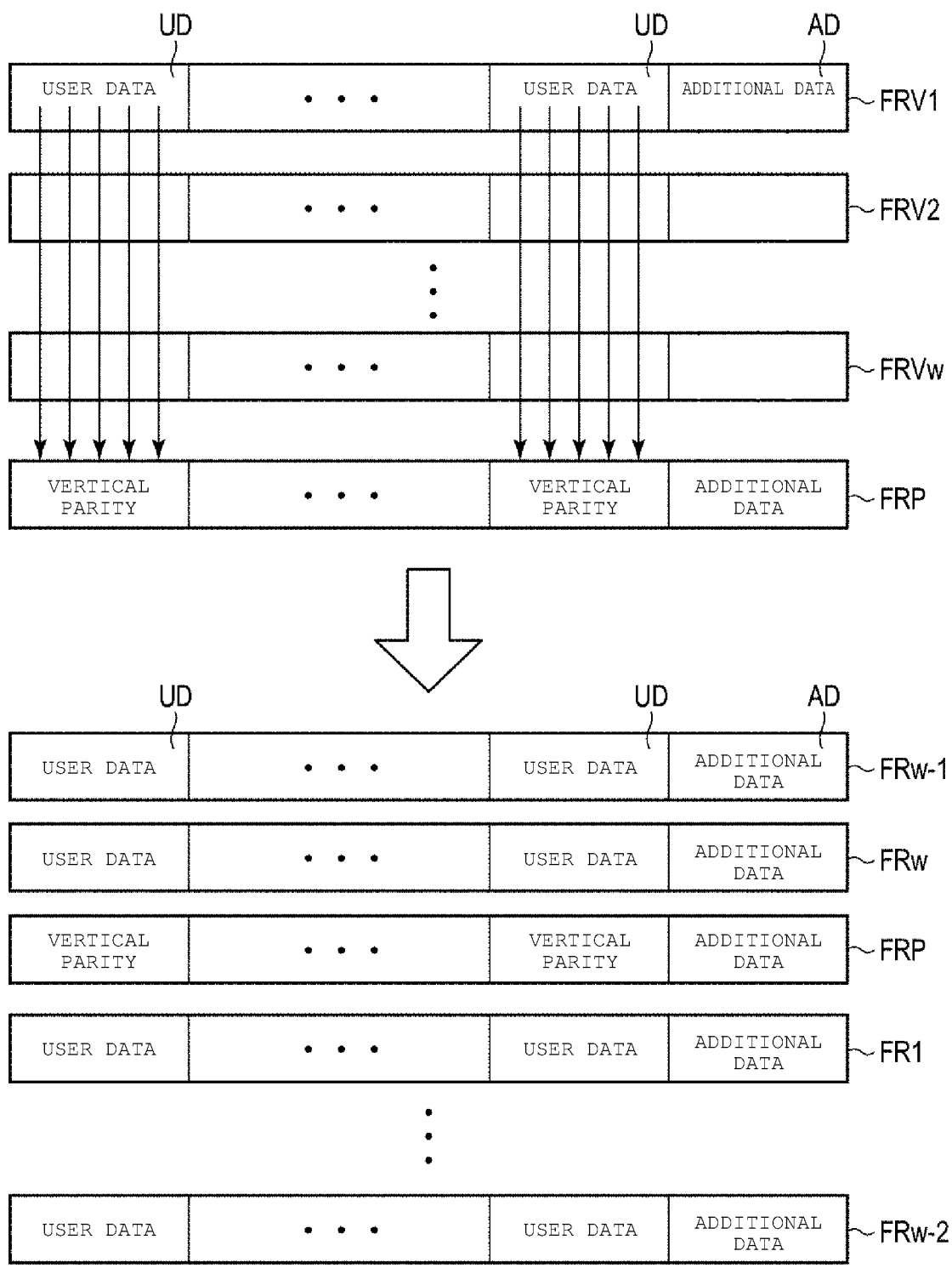
FIG. 16 is a diagram illustrating an example of a plurality of frames and vertical parity frames generated in a third embodiment.

FIG. 16 is a diagram illustrating an example of a plurality of frames FRV1 to FRVw and a vertical parity frame FRP generated in the third embodiment.

Each of the frames FRV1 to FRVw includes user data UD and additional data AD. In some examples, the frames FRV1 to FRVw may also, or instead, include system management information. Here, w is an integer greater than or equal to 2. In FIG. 16, each of the frames FRV1 to FRVw is bit information arranged in the horizontal direction. As depicted in FIG. 16, the bit orders of the frames FRV1 to FRVw are not yet changed, as described in the first and the second embodiments based on the state information. Therefore, the additional data of each frames FRV1 to FRVw are presently located at the same bit position in each of the frames. In FIG. 16, the frames FRV1 to FRVw align in the vertical direction.

The vertical parity frame FRP includes vertical parities generated from a plurality of pieces of bit information aligning in the vertical direction as illustrated in FIG. 16. In other words, the vertical parities included in the vertical parity frame FRP are respectively calculated from the user information included in each of the corresponding plurality of frames FRV1 to FRVw. In the third embodiment, each vertical parity is calculated by an XOR operation using the corresponding user data. The frames FRV1 to FRVw and the vertical parity frame FRP each have the same size. The vertical parity frame FRP includes the calculated vertical parties and the additional data. The vertical parity frame FRP is used for restoring one of the frames FRV1 to FRVw, which was read out by the SCM controller 2 from the SCM chips MD1 to MDz but then failed to be error-corrected by the ECC decoder 82. In the most cases, the errors in the read frame from the SCM chips MD1 to MDz can be corrected by the ECC decoder 82, but there is possibility that the error correction may fail due to the presence of too many errors and thus the data in the frame might be lost. However, in this case, the SCM controller 2 can read out and calculate an XOR value based on the vertical parity frame FRP and all of the frames FRV1 to FRVw (excepting for the lost frame). As a result, the lost frame can be restored.

In the third embodiment, the SCM controller 2 writes the frames FRV1 to FRVw and the vertical parity frame FRP to the SCM chips MD1 to MDz after the change in bit order as described for the first and second embodiments. For example, the SCM chips MD1 to MDz include w pages for storing the frames FRV1 to FRVw and a page for storing the vertical parity frame generated from the frames FRV1 to FRVw stored in the w pages. The SCM controller 2 manages the correspondence between the frames FRV1 to FRVw and the vertical parity frame FRP. For example, SCM controller 2 may associate the frames FRV1 to FRVw with the vertical parity frame FRP by writing the frames FRV1 to FRVw and the vertical parity frame FRP to the SCM chip MD1 to MDz according to the consecutive logical addresses or the consecutive physical addresses. The w pages for storing the frames FRV1 to FRVw preferably correspond to a unit of management (management unit) for the wear leveling process.

When any of the frames FRV1 to FRVw is overwritten by new data, the SCM controller 2 needs to update the vertical parity frame FRP. Specifically, the SCM controller 2 reads the frame of an update target and the vertical parity frame FRP from the SCM chips MD1 to MDz. The SCM controller 2 recalculates the vertical parity based on the read frame of the update target, the vertical parity frame FRP, and the new frame. The result of the recalculated vertical parity can be acquired by calculating XOR of the read frame of the update target, the vertical parity frame FRP, and the new frame. Then, the SCM controller 2 writes the updated vertical parity frame FRP and the new frame of the update target for the SCM chips MD1 to MDz. The SCM controller 2 may perform a read-modify-write to update a portion of the data of the update target frame with new data, as necessary For example, it is assumed that the processor 3 writes each of the frames FRV1 to FRVw once. In this case, the number of writes of each of the frames FRV1 to FRVw increases by 1, but the number of writes of the vertical parity frame FRP increases by w.

Therefore, in the third embodiment, the SCM controller 2 determines whether or not the state information satisfies the arrangement change condition such as exceeding the threshold with reference to the state information managed by management unit for the wear leveling process. Then, when it is determined that the arrangement change condition is satisfied, the SCM controller 2 changes the arrangement order of the frames FRV1 to FRVw and the vertical parity frame FRP. In the third embodiment, the SCM controller 2 shifts the pages in which the frames FRV1 to FRVw and the vertical parity frame FRP are respectively arranged on a page-by-page basis.

The SCM controller 2 determines a write destination or a read destination after positions of the frames FRV1 to FRVw and the vertical parity frame FRP are changed based on the state information. More specifically, after acquiring the physical address by using the address translation table AT and before issuing an access request to the SCM chips MD1 to MDz, the SCM controller 2 further converts the acquired physical address into the physical address further changed by calculation based on the state information, and accesses the SCM chips MD1 to MDz based on the changed physical address.

In the example of FIG. 16, positions of the frames are arranged in the order of the frames FRV1 to FRVw and the vertical parity frame FRP from the top to the bottom. The arrangement of the frames is shifted by two frames according to the predetermined condition. As a result, the positions of the frames are changed to be arranged in the order of the frame FRVw−1, the frame FRVw, the vertical parity frame FRP, and the frames FRV1 to FRw−2 from the top to the bottom. After acquiring the physical address corresponding to unchanged arrangement, the SCM controller 2 shifts the physical address by two frames and determines the physical address corresponding to the changed arrangement. Then, the SCM controller 2 issues the access request to the SCM chips MD1 to MDz based on the physical address corresponding to the determined changed arrangement.

In the third embodiment described above, the SCM controller changes the write destination or the read destination corresponding to at least one of the frames FRV1 to FRVw and the vertical parity frame FRP based on the state information. Then, the SCM controller 2 writes or reads at least one of the frames FRV1 to FRVw and the vertical parity frame FRP to or from the write destination or the read destination changed based on the state information. In the third embodiment, it is possible to prevent wear-out of a page storing the vertical parity frame FRP from progressing more than wear of the pages storing the frames FRV1 to FRVw, and durability of the SCM chips MD1 to MDz can be improved and the lifetimes thereof can be extended.

Fourth Embodiment

The fourth embodiment can be a modification to the first embodiment, the second embodiment, and the third embodiment. In the present description of the fourth embodiment, a modification of the first embodiment will be described as an example, but, in general, the same modification can also be applied to the second embodiment or the third embodiment.

In the first embodiment, a case where an XOR parity is included in the additional data AD of the frame FR is described. In contrast to this, in the fourth embodiment, the XOR parity is not included in the additional data AD of the frame FR and is assumed to be stored in at least one (for example, MD1) of the SCM chips MD1 to MDz.

As such, when the XOR parity is stored in the SCM chip MD1 instead of in the additional data AD, the SCM controller 2 can prevent the XOR parity from being read by using the multicast method.

The SCM controller 2 using the multicast method issues a read request to the SCM chips MD2 to MDz, and when a frame read by the ECC decoder 82 can be error-corrected, the read request is not issued to the SCM chip MD1 that stores the XOR parity. The SCM controller 2 makes a read request to the SCM chip MD1 only when the frame read by the ECC decoder 82 cannot be error-corrected.

In the first embodiment, it is assumed that the SCM controller 2 can recognize which SCM chip stores the XOR parity based on the state data 10. The SCM controller 2 recognizes the bit order of a frame of a read target, recognizes the position of the XOR parity for the frame, and recognizes to which SCM chip(s) a read request is not to be issued to by reference to the state data 10.

In the fourth embodiment described above, by using the multicast method, power consumption of the SCM module 1 can be reduced, and wear-out of memory cells of the SCM chip MD1 can be prevented from progressing due to read of an XOR parity.

In the fourth embodiment, the SCM controller 2 reduces the number of writes or the frequency of writes by another method for the SCM chip MD1 that stores an XOR parity, and thus, memory cells are prevented from wearing unnecessarily. Specifically, the SCM controller 2 adds an XOR parity or the like to consecutive physical addresses. Thereby, memory cells can be prevented from wearing out due to repetitive writes of an XOR parity to the same write destination of the SCM chip MD1.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory controller for controlling a plurality of non-volatile memory chips, the memory controller comprising:
   a memory configured to store first data; and
   a processing unit configured to:
      during a write operation, generate second data including the first data and additional data corresponding to the first data, change a bit order of the second data based on information indicating a state of a write destination for the second data, write the second data having the changed bit order to a plurality of non-volatile memory chips, and
      during a read operation, read the second data having the changed bit order from the plurality of non-volatile memory chips and then restore the bit order of the second data to an original state based on the information indicating the state of the write destination of the second data, wherein
   the information indicating the state of the write destination of the second data includes at least one of:
      a number of readings from the write destination,
      a frequency of writings to the write destination,
      a frequency of readings from the write destination, and
      a frequency of erasings of the write destination, and
   the processing unit is configured to:
      during a write operation, make a first determination to determine whether to change the bit order of the second data based on a type of the first data, then perform a first change process for changing the bit order of the second data when the first determination is that the bit order is to be changed, and not perform the first change process when the first determination is that the bit order is not to be changed, and
      during a read operation, make a second determination to determine whether to restore the bit order of the second data to an original state based on the type of the first data, then perform a second change process for restoring the bit order of the second data to the original state when the second determination is that the bit order is to be restored to the original state, and not perform the second change process when the second determination is that the bit order is to be restored to the original state.

2. The memory controller according to claim 1, wherein the processing unit is further configured to:
   manage a weighted value of the information,
   change the bit order of the second data based on the weighted value during a write operation, and
   restore the bit order of the read second data to an original state during a read operation based on the weighted value.

3. The memory controller according to claim 1, wherein the processing unit is configured to:
   during a write operation, determine that the bit order of the second data is to be changed when the first data is user data received from an external device and that the bit order of the second data is not to be changed when the first data is system management information, and
   during a read operation, determine that the bit order of the second data that has been read is to be restored to the original state when the first data included in the second data is the user data and that the bit order is not to be changed when the first data included in the second data that is system management information.

4. The memory controller according to claim 1, wherein the processing unit is configured to write the second data to the plurality of non-volatile memory chips without changing the bit order when the second data is to be written to consecutive addresses during a write operation.

5. The memory controller according to claim 1, wherein the processing unit is configured to:
   manage an address conversion information in which a logical address, a physical address, and a change pattern for the bit order of the second data written to a position indicated by the physical address are associated with each other,
   during a write operation, change the bit order of the second data written to the position indicated by the physical address based on the change pattern, and during a read operation, restore the bit order of the second data that is read from the position indicated by the physical address to an original state based on the change pattern indicated in the address conversion information for the physical address.

6. The memory controller according to claim 1, wherein the processing unit is configured to:
write the second data having the changed bit order to multiple memory chips in the plurality of non-volatile memory chips during a write operation, and
read the second data stored in the multiple memory chips and having the changed bit order during a read operation.

7. The memory controller according to claim 1, wherein the processing unit is configured to:
write the second data having the changed bit order to multiple memory chips in the plurality of non-volatile memory chips during a write operation, and
read the second data stored in the multiple memory chips and having the changed bit order during a read operation.

8. The memory controller according to claim 1, wherein the additional data includes a parity used for error detection and error correction for the first data, and
the processing unit is a storage class memory (SCM) module.

9. The memory controller according to claim 1, wherein the additional data includes a parity used for error detection and error correction for the first data.

10. The memory controller according to claim 1, wherein when the information is updated, the processing unit is configured to write the updated information to a position different from the position of the second data in the plurality of non-volatile memory chips.

11. The memory controller according to claim 1, wherein the information indicates the state of the write destination of the second data and a state of a write destination of third data having the same size as the second data, and
the processing unit is configured to use the same bit order for the second data and the third data based on the information when writing the second data and the third data with a changed bit order to the plurality of non-volatile memory chips during a write operation for the second data.

12. The memory controller according to claim 1, wherein the processing unit is configured to:
during a write operation, calculate a vertical parity based on the second data and third data having the same size as the second data, and then generate fourth data having the same size as the second data and including the vertical parity, and
change a write destination or a read destination corresponding to at least one of the second data, the third data, and the fourth data based on the information.

13. The memory controller according to claim 1, wherein the additional data includes a first parity for error correction of the first data, and
the processing unit is configured to:
during a write operation, calculate a second parity corresponding to the second data, and then write the second data having the changed bit order to the plurality of non-volatile memory chips and write the second parity to another non-volatile memory different from the plurality of non-volatile memory chips, and
during a read operation recognize the plurality of non-volatile memory chips storing the second data and the other non-volatile memory storing the second parity based on the information, then read the second data having the changed bit order from the plurality of non-volatile memory chips and the second parity from the other non-volatile memory only when an error of the first data occurs that is not correctable by using the first parity.

14. A memory controller for controlling a non-volatile memory, the memory controller comprising:
a memory configured to store first data; and
a processing unit configured to:
generate second data including the first data and additional data corresponding to the first data,
change a bit order of the second data based on information indicating a state of a write destination for the second data,
write the second data having the changed bit order to a plurality of write destinations,
read the second data having the changed bit order from the plurality of write destinations, and
restore the bit order of the second data read from the plurality of write destinations to an original state based on the information, wherein
the information indicating the state of the write destination of the second data includes at least one of:
a number of readings from the write destination,
a frequency of writings to write destination,
a frequency of readings from the write destination, and
a frequency of erasings of the write destination,
the additional data includes a first parity for error correction of the first data, and
the processing unit is configured to:
during a write operation, calculate a second parity corresponding to the second data, and then write the second data having the changed bit order to the plurality of write destinations and write the second parity to another write destination different from the plurality of write destination for the second data, and
during a read operation, recognize the plurality of write destination storing the second data and the other write destination storing the second parity based on the information, then read the second data having the changed bit order from the plurality of write destinations and the second parity from the other write destination only when an error of the first data occurs that is not correctable by using the first parity.

15. The memory controller according to claim 14, wherein the plurality of write destinations are in a non-volatile memory.

16. A memory system, comprising:
a plurality of non-volatile memory chips; and
a controller connected to the plurality of non-volatile memory chips and configured to:
during a write operation, generate second data including first data and additional data corresponding to the first data, change a bit order of the second data based on information indicating a state of a write destination for the second data, and write the second data having the changed bit order to the plurality of non-volatile memory chips, and
during a read operation, read the second data having the changed bit order from the plurality of non-volatile memory chips and then restore the bit order of the read second data to an original state based on the information, wherein
the information indicating the state of the write destination of the second data includes at least one of:

a number of readings from the write destination,
a frequency of writings to write destination,
a frequency of readings from the write destination, and
a frequency of erasings of the write destination, and
the controller is configured to:
  during a write operation, make a first determination to determine whether to change the bit order of the second data based on a type of the first data, then perform a first change process for changing the bit order of the second data when the first determination is that the bit order is to be changed, and not perform the first change process when the first determination is that the bit order is not to be changed, and
  during a read operation, make a second determination to determine whether to restore the bit order of the second data to an original state based on the type of the first data, then perform a second change process for restoring the bit order of the second data to the original state when the second determination is that the bit order is to be restored to the original state, and not perform the second change process when the second determination is that the bit order is to be restored to the original state.

17. A memory controller for controlling a plurality of non-volatile memory chips, the memory controller comprising:
  a memory configured to store first data; and
  a processing unit configured to:
  during a write operation, generate second data including the first data and additional data corresponding to the first data, change a bit order of the second data based on information indicating a state of a write destination for the second data, write the second data having the changed bit order to a plurality of non-volatile memory chips, and
  during a read operation, read the second data having the changed bit order from the plurality of non-volatile memory chips and then restore the bit order of the second data to an original state based on the information indicating the state of the write destination of the second data, wherein
  the processing unit is further configured to:
    during a write operation, make a first determination to determine whether to change the bit order of the second data based on a type of the first data, then perform a first change process for changing the bit order of the second data when the first determination is that the bit order is to be changed, and not perform the first change process when the first determination is that the bit order is not to be changed, and
    during a read operation, make a second determination to determine whether to restore the bit order of the second data to an original state based on the type of the first data, then perform a second change process for restoring the bit order of the second data to the original state when the second determination is that the bit order is to be restored to the original state, and not perform the second change process when the second determination is that the bit order is to be restored to the original state.

18. The memory controller according to claim 17, wherein the processing unit is configured to:
  during a write operation, determine that the bit order of the second data is to be changed when the first data is user data received from an external device and that the bit order of the second data is not to be changed when the first data is system management information, and
  during a read operation, determine that the bit order of the second data that has been read is to be restored to the original state when the first data included in the second data is the user data and that the bit order is not to be changed when the first data included in the second data that is system management information.

* * * * *

UNITED STATES PATENT AND TRADEMARK OFFICE
CERTIFICATE OF CORRECTION

PATENT NO. : 11,836,039 B2
APPLICATION NO. : 17/466183
DATED : December 5, 2023
INVENTOR(S) : Yoshiki Saito It is certified that error appears in the above-identified patent and that said Letters Patent is hereby corrected as shown below:

On the Title Page

Item (30), the foreign priority application should read as follows:
March 23, 2021 (JP).............2021048592

Signed and Sealed this
Eleventh Day of June, 2024

Katherine Kelly Vidal
*Director of the United States Patent and Trademark Office*